(12) United States Patent
Li et al.

(10) Patent No.: US 8,953,475 B2
(45) Date of Patent: Feb. 10, 2015

(54) BASE STATION, USER EQUIPMENT, AND METHODS THEREIN IN A COMMUNICATIONS SYSTEM

(75) Inventors: Shaohua Li, Beijing (CN); Yang Hu, Beijing (CN); Jianfeng Wang, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 206 days.

(21) Appl. No.: 13/496,445

(22) PCT Filed: Jan. 30, 2012

(86) PCT No.: PCT/CN2012/070773
§ 371 (c)(1),
(2), (4) Date: Mar. 15, 2012

(87) PCT Pub. No.: WO2013/113144
PCT Pub. Date: Aug. 8, 2013

(65) Prior Publication Data
US 2013/0194940 A1    Aug. 1, 2013

(51) Int. Cl.
*H04L 12/26* (2006.01)
(52) U.S. Cl.
USPC ............................................. 370/252
(58) Field of Classification Search
CPC ....................................................... H04L 47/10
USPC ........................................... 370/23, 230, 252
See application file for complete search history.

(56) References Cited

U.S. PATENT DOCUMENTS

2008/0188260 A1* 8/2008 Xiao et al. ............... 455/522
2010/0103867 A1* 4/2010 Kishiyama et al. ...... 370/320
(Continued)

FOREIGN PATENT DOCUMENTS

| CN | 101867457 A | 6/2010 |
| CN | 101986586 A | 3/2011 |

(Continued)

OTHER PUBLICATIONS

Unknown, Author, "Finalizing Nominal PDSCH-to-RS EPRE Offset for CQI Reporting", 3GPP TSG RAN WG1 54bis, R1-084012, Texas Instruments/Ericsson/Motorola/NEC, Prague, Czech Republic, Sep. 29-Oct. 3, 2008, pp. 1-5.

(Continued)

*Primary Examiner* — Hassan Kizou
*Assistant Examiner* — Abdullahi Ahmed
(74) *Attorney, Agent, or Firm* — Murphy Bilak & Homilier, PLLC

(57) ABSTRACT

A method in a first base station for obtaining channel state information from a user equipment is provided. The first base station is comprised in a wireless communication system. The wireless communication system further comprises the user equipment. The first base station estimates (403) a first offset value for a first set of subframes based on a first channel information. The first base station further estimates (404) a second offset value for a second set of subframes based on a second channel information. The first base station transmits (405) the estimated first offset value and the estimated second offset value to the user equipment. The first base station then obtains (407) channel state information from the user equipment. The channel state information is based on the transmitted estimated first offset value and the estimated second offset value. The channel state information is to be used for transmission in the first base station.

48 Claims, 6 Drawing Sheets

⊠ ABS
☐ non-ABS
◺ subframes with low macro interference
▦ subframes with high macro interference
◿ CSI measured subframes
☐ CSI non-measured subframes

(56) References Cited

U.S. PATENT DOCUMENTS

| | | | |
|---|---|---|---|
| 2010/0329113 A1* | 12/2010 | Madan et al. | 370/230 |
| 2011/0312358 A1* | 12/2011 | Barbieri et al. | 455/507 |
| 2012/0052899 A1* | 3/2012 | Wang et al. | 455/513 |
| 2012/0134275 A1* | 5/2012 | Choi et al. | 370/241 |
| 2012/0201152 A1* | 8/2012 | Yoo et al. | 370/252 |
| 2012/0236735 A1* | 9/2012 | Nory et al. | 370/252 |
| 2012/0327795 A1* | 12/2012 | Mallik et al. | 370/252 |
| 2013/0021932 A1* | 1/2013 | Damnjanovic et al. | 370/252 |
| 2013/0044621 A1* | 2/2013 | Jung et al. | 370/252 |
| 2013/0078913 A1* | 3/2013 | Lee et al. | 455/39 |
| 2013/0114425 A1* | 5/2013 | Sayana et al. | 370/252 |
| 2013/0303090 A1* | 11/2013 | Hammarwall et al. | 455/67.13 |
| 2013/0310091 A1* | 11/2013 | Tabet et al. | 455/501 |

FOREIGN PATENT DOCUMENTS

| | | |
|---|---|---|
| CN | 102255689 A | 11/2011 |
| CN | 102315871 A | 1/2012 |
| WO | 2011010863 A2 | 1/2011 |

OTHER PUBLICATIONS

Unknown, Author, "Further Results on CQI Measurement Methodology", 3GPP TSG-RAN WG1 #53, R1-082014, Ericsson, Kansas City, USA, May 5-9, 2008, pp. 1-3.

Unknown, Author, "System Simulation Results and Methodology for Defining Interference Levels in eICIC Performance Tests", 3GPP TSG-RAN WG4 Meeting #61, R4-116082, Ericsson/ST-Ericsson, San Francisco, USA, Nov. 14-18, 2011, pp. 1-6.

* cited by examiner

BASE STATION, USER EQUIPMENT, AND METHODS THEREIN IN A COMMUNICATIONS SYSTEM

TECHNICAL FIELD

Embodiments herein relates generally to a method in a base station, a method in a user equipment, a base station and a user equipment. In particular, embodiments relate to obtaining and transmitting channel state information feedback in a wireless communication system.

BACKGROUND

The 3rd Generation Partnership Project (3GPP) is responsible for the standardization of the Universal Mobile Telecommunication System (UMTS) and Long Term Evolution (LTE). The 3GPP work on LTE is also referred to as Evolved Universal Terrestrial Access Network (E-UTRAN). LTE is a technology for realizing high-speed packet-based communication that can reach high data rates both in the downlink and in the uplink, and is thought of as a next generation mobile communication system relative to UMTS.

In LTE, Orthogonal Frequency Division Multiplexing (OFDM) is used in the downlink. The LTE physical resource may be seen as a time-frequency grid, where each resource element, i.e. each square in the grid, corresponds to one OFDM subcarrier during one OFDM symbol interval. Resource allocation in LTE is described in terms of Resource Blocks (RBs) and a subframe comprises a resource block pair, i.e. two time-consecutive resource blocks. The control region of a subframe comprises e.g. the Physical Downlink Control Channel (PDCCH) on which control information such as downlink scheduling assignments and uplink scheduling grants are transmitted. In the data region, data is transmitted on the Physical Downlink Shared Channel (PDSCH).

Some of the resource elements within the time-frequency grid are used to transmit reference symbols, which are known symbols which may e.g. be used by a receiver for channel estimation in order to perform coherent demodulation. The reference symbols, which may also be called reference signals, are also used for mobility measurements and for uplink power control performed by user equipments. In LTE, cell specific reference symbols, i.e. Common Reference Signals (CRS) are transmitted in all downlink subframes. Since the CRS is common to all user equipments in a cell, the transmission of CRS cannot be easily adapted to suit the needs of a particular user equipment. As of LTE Release-10, a new reference signals concept was introduced with separate user equipment-specific reference signals for demodulation of PDSCH and separate reference signals for measuring the channel for the purpose of Channel State Information (CSI) feedback from the user equipment. The reference signals for measuring the channel for the purpose of channel state information feedback from the user equipment is referred to as Channel State Information Reference Signals (CSI-RS). CSI-RS are not transmitted in every subframe, and the CSI-RS are generally sparser in time and frequency than reference signals used for demodulation. CSI-RS transmissions may occur every 5th, 10th, 20th, 40th, or 80th subframe according to a Radio Resource Control (RRC) configured periodicity parameter and an RRC configured subframe offset.

There is an increasing demand for higher data rates in wireless networks, which poses challenges to developers of such networks. One approach to meeting requirements for higher data rates is to deploy Heterogeneous Networks (HetNets) i.e. a network containing nodes, e.g. base stations, operating with different transmission power. Base stations operating with high transmission power are herein denoted macro base stations and base stations operating with lower transmission power are herein denoted pico base stations. HetNets thus comprise deployments where pico base stations are placed throughout a macro-cell layout. The cell of the base station operating with low transmission power can be e.g. either pico-cell or Close Subscriber Group (CSG) cell or micro-cell.

Cell selection by user equipments is typically based on downlink received power, including the effects of the different base station transmission power. This leads to an 'imbalance area' surrounding the pico base station where the path loss is lower towards the pico base station, but the macro base station is still selected due to its higher transmission power. In the uplink direction, where the transmit power is the same, it would be better for a user equipment to be connected to the pico base station also in this area. By increasing transmission power of the pico base stations, the cell size of pico base stations can be increased. However, doing so affects the cost and size of the base station, which in turn limits site availability. The range of the pico base station can also be expanded by using a cell selection offset that favours the selection of the pico base station. This leads to the uplink signal being received in the best base station, i.e. the pico base station, and offloads the macro to a greater extent. These benefits, however, come at the cost of higher downlink interference from the macro base station for users on the border of the pico-cell.

Thus, solutions for Inter-Cell Interference Coordination (ICIC) are particularly important in HetNets. One approach is to separate transmissions from the macro layer and the pico layer in time, sometimes referred to as time-domain ICIC. This may be achieved by silencing the interfering macro base station in certain subframes. LTE Release 10 introduced Almost Blank Subframes (ABS) which are subframes with reduced transmit power, or no transmit power, on some physical channels and/or reduced activity. ABS with reduced downlink transmission power may also be called Reduced Power SubFrames (RPSF). The base station may still transmit necessary control channels and physical signals as well as system information in the ABS, in order to ensure backwards compatibility towards user equipments. Alternatively, the need to transmit these signals in ABS may be avoided by careful selection of ABS patterns. ABS and RPSF are thus relevant in order to secure reliable transmission of control channel and efficient transmission of PDSCH to user equipments close to the boarder of the pico-cell. When ABS is configured the deployments of macro- and pico-cells are jointly planned by the operator, and the cells are time-aligned. The pico-cells can provide enhanced capacity locally or improved indoor coverage.

In HetNets, there are two ABS configurations, Multicast and Broadcast Single Frequency Network (MBSFN) ABS and non-MBSFN ABS, which are both configured by operator upon network planning and both configurations are applicable to the embodiments describe herein. The downlink reference signals may be used to estimate and measure channel impulse response to assist demodulation and channel quality monitoring. The downlink reference signals are regarded as either cell-specific reference signals, i.e. CRS, or CSI-RS herein. In HetNet deployments with macro- and pico-cells, the reference signals in either cell would be configured as colliding reference signals or non-colliding reference signals, which mean that the reference signals in pico-cell do or do not collide with the reference signals in the macro-cell. The CRS are called colliding when the CRS in different cells are in the same time-frequency grid.

In HetNets, for a user equipment in a pico-cell close to the border of that pico-cell, the strength of macro reference signals may be much stronger than that of pico reference signals. As an example, the strength of macro reference signals is about 0~6 dB stronger than the strength of pico reference signals in LTE Release 10 and about 6~12 dB stronger in LTE Release 11. In order to secure reliable transmission of control channel and efficient transmission of the PDSCH, to a user equipment close to a border in pico-cells, the ABS are configured in the macro-cell in 3GPP TS 36.423 (version 10.2.0 and section 9.2.54), where only Physical Broadcast Channel (PBCH), Primary Synchronization Signal (PSS), Second Synchronization Signal (SSS) and reference signals are transmitted, and no other data channel is transmitted. Hence, in ABS, a user equipment close to the border of a pico-cell experiences low macro interference for the data channel, and oppositely very high macro interference in non-ABS. On the other hand, for user equipments closer to the center of a pico-cell, the macro signal is always relatively low, compared with a pico signal and hence, interference is always low for user equipments close to the center of a pico-cell. An example of the relationship between the interference level and the ABS is shown in FIG. 1. As illustrated in FIG. 1, the macro base station, Macro eNB, may have ABS and non-ABS. A user equipment, exemplified as a Pico UE 1 in FIG. 1, close to the border of a pico-cell experiences low macro interference in subframes which corresponds to subframes in the Macro eNB which are ABS. Pico UE 1 experiences high macro interference in subframes which corresponds to subframes in the Macro eNB which are non-ABS. A user equipment, exemplified as a Pico UE 2 in FIG. 1, close to the center of a pico-cell experiences low macro interference in all subframes.

Since the interference level experienced by user equipments in a pico-cell, in a HetNet, may be different coming from macro ABS and macro non-ABS, the channel state information measured at user equipments for the subframes shall be not the same, which means that for channel state information calculation, average over all subframes should be prohibited. Channel state information may comprise one or more of Channel Quality Indicator (CQI), Preferred Matrix Indicator (PMI) and Rank Indicator (RI). This has been discussed in 3GPP TS 36.211 (version 10.0.0 and section 6.10) where two subframe sets, CSI_0 and CSI_1, are signaled to user equipment for measurement. The measurement and feedback for each CSI subframe set are conducted independently. As illustrated in FIG. 1, the first subframe set CSI_0 may measure the subframes which are aligned with, i.e. interfered by, macro ABS, and the second subframe set CSI_1 may measure the subframes which are aligned with, i.e. interfered by, macro non-ABS. In a macro-cell in a HetNet, the received power and/or the interference level experienced by user equipments in the macro-cell may be different coming from macro RPSF and macro non-RPSF. As a result, the channel state information measured at user equipments for the subframes shall not be the same and thus the measurement and feedback for the two subframe sets, CSI_0 and CSI_1, are conducted independently. CSI_0 may correspond to the set of macro subframes which have a lower power, and CSI_1 may correspond to the set of macro subframes which have a higher power.

Even if the measurement and feedback are done separately for each CSI subframe in a user equipment, there is still an interference problem that is not solved. The problem is that an interference measured from reference signals resource elements (REs) is different from the interference experienced by PDSCH REs in data symbols both for CSI_0 subframes and CSI_1 subframes. This difference in interference leads to an interference mismatch problem. The interference mismatch problem results in that a user equipment which uses reference signals REs for calculating channel state information does not derive the correct channel state information.

SUMMARY

It is therefore an object of the embodiments herein to achieve a more reliable communication with higher spectrum efficiency in a communications system.

According to a first aspect of embodiments herein, the object is achieved by a method in a first base station for obtaining channel state information from a user equipment. The first base station is comprised in a wireless communication system. The wireless communication system further comprises the user equipment. The first base station estimates a first offset value for a first set of subframes based on a first channel information. The first base station further estimates a second offset value for a second set of subframes based on a second channel information. The subframes of the first set of subframes are of a first type and the subframes of the second set of subframes are of a second type. The first base station transmits the estimated first offset value and the estimated second offset value to the user equipment. The first base station then obtains channel state information from the user equipment. The channel state information is based on the transmitted estimated first offset value and the estimated second offset value. The channel state information is to be used for transmission in the first base station.

According to a second aspect of embodiments herein, the object is achieved by a method in a user equipment for transmitting channel state information to a first base station. The user equipment is comprised in a wireless communication system. The wireless communication system further comprises the first base station. The user equipment estimates a first Signal to Interference and Noise Ratio, SINR, based on reference signals for subframes of a first type. The user equipment further estimates a second SINR based on reference signals for subframes of a second type. The user equipment receives a first offset value for subframes of the first type and a second offset value for the second type of subframes from the first base station. The user equipment then creates a compensated first SINR based on the estimated first SINR and the received first offset value and creates a compensated second SINR based on the estimated second SINR and the received second offset value. The user equipment further calculates channel state information based on said created compensated first SINR and said created compensated second SINR. The user equipment then transmits the calculated channel state information to the first base station.

According to a third aspect of embodiments herein, the object is achieved by a first base station configured to obtain channel state information from a user equipment. The first base station is comprised in a wireless communication system. The wireless communication system further comprises the user equipment. The first base station comprises an estimating circuit configured to estimate a first offset value for a first set of subframes based on a first channel information and to estimate a second offset value for a second set of subframes based on a second channel information. The subframes of the first set of subframes are of a first type and the subframes of the second set of subframes are of a second type. The first base station further comprises a first transmitting circuit configured to transmit the estimated first offset value for the first set of subframes and the estimated second offset value for the second set of subframes to the user equipment. The first base station further comprises a first receiving circuit configured to obtain channel state information from the user equipment. The channel state information is based on the transmitted estimated first offset value and the estimated second offset value, and the channel state information is to be used for transmission in the first base station.

According to a fourth aspect of embodiments herein, the object is achieved by a user equipment configured to transmit channel state information to a first base station. The user equipment is comprised in a wireless communication system. The wireless communication system further comprises the first base station. The user equipment comprises an estimating circuit configured to estimate a first signal to interference and noise ratio, SINR, based on reference signals for subframes of a first type and to estimate a second signal to interference and noise ratio, SINR, based on reference signals for subframes of a second type. The user equipment further comprises a first receiving circuit configured to receive a first offset value for subframes of a first type and to receive a second offset value for a second type of subframes from the first base station. The user equipment further comprises a creating circuit configured to create a compensated first SINR based on the estimated first SINR and the received first offset value and to create a compensated second SINR based on the estimated second SINR and the received second offset value. The user equipment further comprises a calculating circuit configured to calculate channel state information based on said created compensated first SINR and said created compensated second SINR. The user equipment further comprises a transmitting circuit configured to transmit the calculated channel state information to the first base station.

Since the calculated channel state information is based both on the first offset value and the second offset value more accurate channel state information is calculated. The more accurate channel state information is used in the first base station to adapt one or more transmissions in the wireless communication system to current channel conditions. Hence, by calculating more accurate channel state information a more reliable communication with higher spectrum efficiency in the wireless communications system is achieved.

An advantage with embodiments described herein is that channel state information may be well measured and compensated both in Almost Blank Subframes and non-Almost Blank subframes.

Another advantage with embodiments described herein is that network performance may be improved significantly. With accurate channel state information, optimized modulation and coding schemes can be selected to adapt to the channel, and more channel capacity can be obtained. Further, with accurate channel state information, more accurate scheduling can be used. Thus, network performance may be improved significantly.

BRIEF DESCRIPTION OF THE DRAWINGS

Examples of embodiments herein are described in more detail with reference to attached drawings which.

DETAILED DESCRIPTION

Embodiments will be exemplified in the following non-limiting description.

Figure 1:
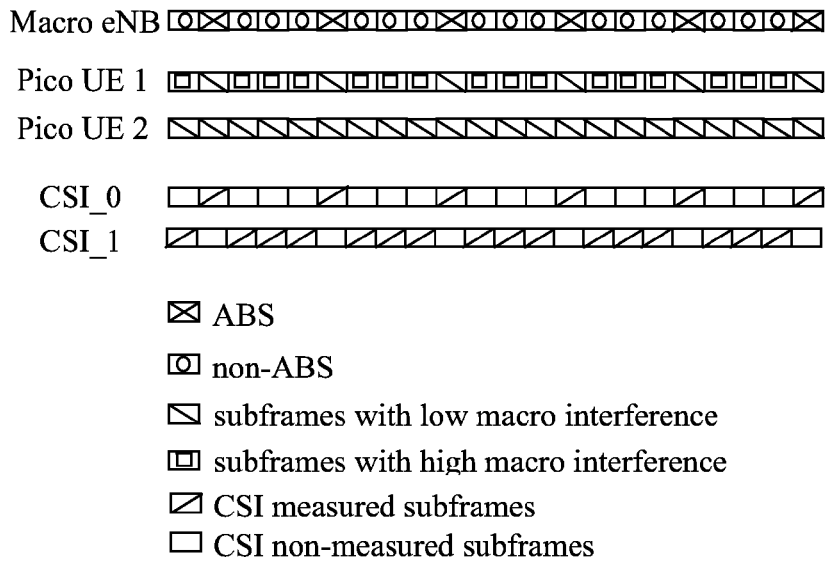
FIG. 1 is a diagram illustrating an example of interference in different subframes.
Figure 2:
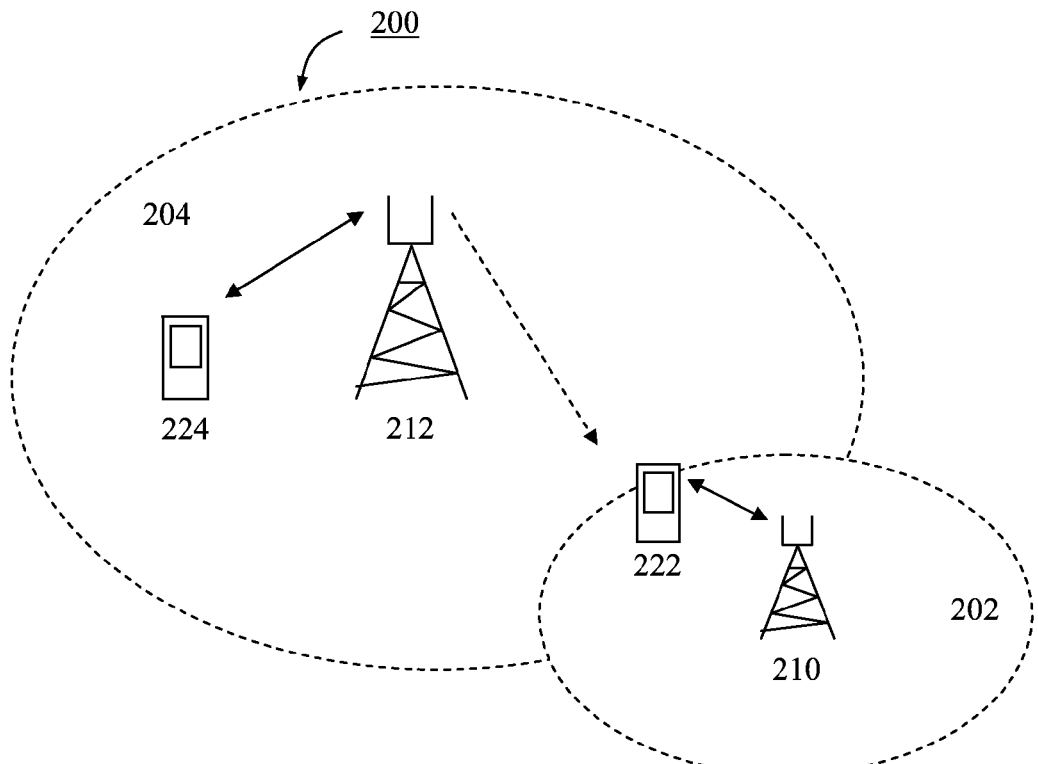
FIG. 2 is a schematic block diagram illustrating embodiments in a wireless communication system.

FIG. 2 depicts a wireless communication system 200, such as a HetNet 200, in which embodiments herein may be implemented. The wireless communication system 200 may be configured for different technologies such as an E-UTRAN, WiMAX, or any other similar technology.

The wireless communication system 200 comprises a first base station 210. The first base station 210 is a radio base station serving a first cell 202. The wireless communication system 200 may in some embodiments further comprise a second base station 212. The second base station 212 is a radio base station serving a second cell 204. The first base station 210 and the second base station 212 are radio network nodes which in this example e.g. may be eNBs, eNodeBs, or Home Node Bs, Home eNode Bs, WiMAX base stations, or any other network units capable to serve a user equipment of a machine type communication device in the wireless communication system 200. The first base station 210 may for example be a base station operating with high transmission power or a base station operating with low transmission power. The second base station 212 may also for example be a base station operating with high transmission power or a base station operating with low transmission power. A base station operating with high transmission power are herein denoted a macro base station but may also be referred to by other terms such as an aggressor base stations or a high power base stations. A base station operating with lower transmission power are herein denoted a pico base station, but may also be referred to by other terms such as a micro, a low power, a victim or a femto base station. The pico base station may further be referred to by the terms a stand-alone base station, a relay, or a Remote Radio Unit (RRU), also referred to as a Remote Radio Head (RRH). The first base station 210 may e.g. be a pico base station or a macro base station. The second base station 212 may also e.g. be a pico base station or a macro base station.

One or more user equipment 222 are located within the first cell 202 and one or more user equipment 224 are located within the second cell 204. The user equipment 222 is configured to communicate within the wireless communication system 200 via the first base station 210 over a radio link when the user equipment 222 is present in the cell 202 served by the first base station 210. The user equipment 224 is configured to communicate within the wireless communication system 200 via the second base station 212 over a radio link when the user equipment 224 is present in the cell 204 served by the second base station 212. The user equipment 222, 224 may e.g. be a mobile terminal or wireless terminal, a mobile phone, a device, a computer such as e.g. a laptop, Personal Digital Assistant PDA or a tablet computer, sometimes referred to as a surf plate, with wireless capability, or any other radio network unit capable to communicate over a radio link in the wireless communications system 200.

As part of developing embodiments herein a problem will first be identified and discussed. It has been detected that in the first base station 210 the interference level and/or the received desired signal power measured at reference signals REs is mismatched with that measured at PDSCH REs for both subframes of a first type and subframes of a second type. The mismatch level between reference signals REs and PDSCH REs is significantly different for subframes of the first type and subframes of the second type. The subframes of the first type may be subframes that are interfered by ABS and the subframes of the second type may be subframes that are interfered by non-ABS. It is also different depending on if the reference signals are colliding Common Reference Signals (CRS), non-colliding CRS or Channel State Information Reference Signals (CSI-RS).

In order to handle the mismatch of interference in the first base station 210 more accurately channel state information feedback need to be obtained from the user equipment 222. This is achieved by the embodiments described herein. For example, the first base station calculates a first offset value and a second offset value. The two offset values are transmitted to the user equipment 222 and the two offset values may enable the user equipment to calculate channel state information for each set of subframes taking the difference in interference and/or differences in received signal power for the subframes of the first type and for the subframes of the second type into consideration. The base station obtains the channel state information which is based on the two offset values and hence more accurate channel state information feedback is obtained.

Figure 3:
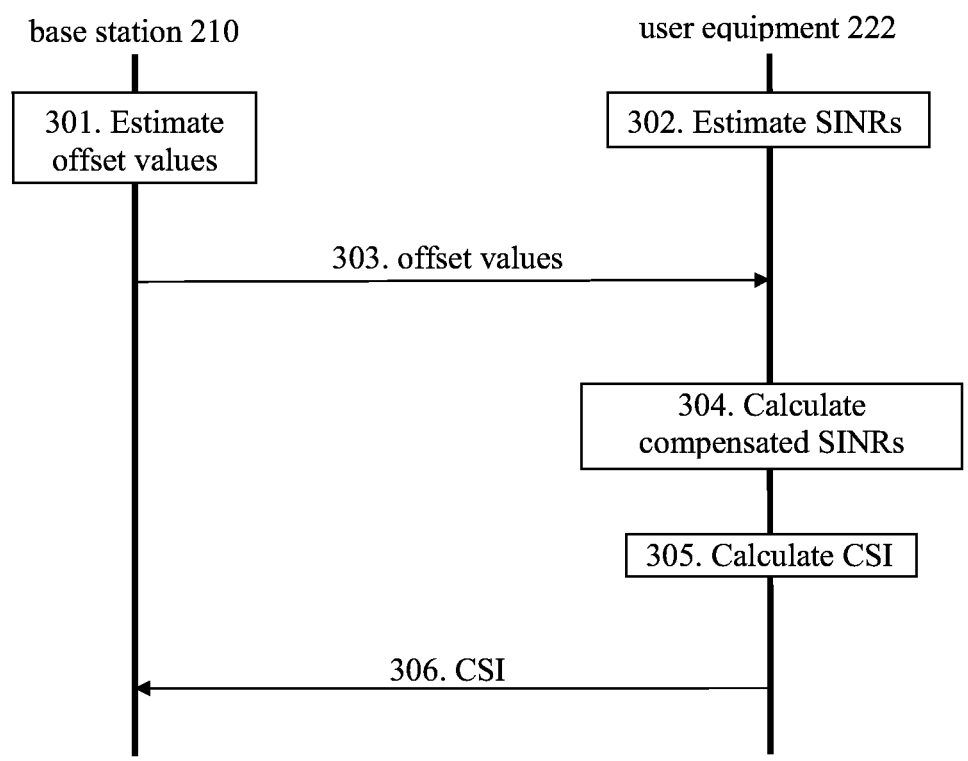
FIG. 3 is a combined signaling diagram and flowchart.

Embodiments of a method for obtaining channel state information will now be described with reference to a combined signaling diagram and flowchart depicted in FIG. 3. The embodiments of the method comprises the following actions, which actions may as well be carried out in another suitable order then described below.

Action 301

The first base station 210 estimates two offset values, i.e. a first offset value for a first set of subframes and a second offset value for a second set of subframes. The two offset values may be estimated by estimating a ratio difference between a first Signal to Interference and Noise Ratio (SINR) measured at reference signals REs and a second SINR measured at PDSCH REs. SINR is used in wireless communication systems as a way to measure the quality of wireless connections. The ratio difference may indicate differences in interference in different set of subframes and/or differences in received signal power in different set of subframes. The two offset values may enable the user equipment 222 to calculate channel state information for each set of subframes taking the difference in interference and/or differences in received signal power into consideration. Subframes of the first set of subframes are of a first type and subframes of the second set of subframes are of a second type. The estimations of the two offset values are based on a first channel information and on a second channel information, respectively. The first channel information and the second channel information may be the same or different channel information. The first and second channel information may comprise one or more of load information, position information, statistics of an outer loop link adaptation operation, reference signal values and other channel information. In some embodiments, the first and second channel information may have been previously received from the user equipment 222. How the first offset value and the second offset values are estimated will be described further below. How the subframes of the first type and the second type are determined will also be described further below.

Action 302

The user equipment 222 estimates Signal to Interference and Noise Ratios (SINR) based on reference signals. This means that the user equipment 222 estimates a first SINR based on reference signals for subframes of a first type and a second SINR based on reference signals for subframes of a second type. How SINRs is estimated will be described further below. The SINRs are estimated to enable the user equipment 222 to calculate channel state information described in action 305 below. The reference signals for subframes of the first type and the reference signals of the second type may be used for estimating one or more of a channel impulse response, an interference and noise level. The channel impulse response, the interference and the noise level may be estimated for a communication channel, by using the reference signals, to determine the quality of the channel. The one or more of the estimated channel impulse response, interference and noise level may in some embodiments be used for estimating the first SINR and the second SINR. The reference signals may, in some embodiments, be CRS or CSI-RS. In some embodiments, the reference signals may have been previously received from the first base station 210.

Action 303

The first base station 210 transmits the offset values, i.e. the first offset value and the second offset value, which are received by the user equipment, 222. The first base station 210 may transmit these offset values to indicate differences in interference and/or received desired signal power in different sets of subframes and/or differences in received signal power in different set of subframes. These offset values is be used when calculating the channel state information in action 305 below.

Action 304

The user equipment 222 creates two compensated SINRs, i.e. a first compensated SINR and a second compensated SINR. The first compensated SINR is created based on the first SINR estimated in action 302 and on the first offset value received in action 303. The second compensated SINR is created based on the second SINR estimated in action 302 and on the second offset value received in action 303. How the compensated SINRs may be created will be described further below. The user equipment 222 creates two compensated SINRs to be able to more accurately calculate channel state information in action 305 below.

Action 305

The user equipment 222 further calculates channel state information based on the compensated first SINR created in action 304 and the compensated second SINR created in action 304. The channel state information is calculated in order to help the first base station 210 to choose a suitable transmission format and suitable transmission schemes and hence, achieve a more reliable communication with higher spectrum efficiency in the wireless communication system 200. The channel state information may comprise one or more of a CQI, a PMI and a RI. The CQI, the PMI and/or RI may be estimated based on one or more of the compensated first SINR, created in action 304, the compensated second SINR, created in action 304, the estimated channel impulse response, estimated in action 302, interference, estimated in action 302, and noise level, estimated in action 302. The estimated channel impulse response, interference, and/or noise level may be estimated based on the reference signals for the first type and second type. How the channel state information, the CQI, the PMI and the RI may be calculated will be further described below.

Action 306

The user equipment 222 sends the channel state information to the first base station 210, calculated in action 305, which channel state information is thus obtained by the first base station 210. The first base station 210 may now use the channel state information for transmission in the first base station 210. The channel state information may help the first base station 210 to choose a suitable transmission format and suitable transmission schemes. The terms suitable transmission format and suitable transmission schemes may also be referred to as appropriate transmission format and appropriate transmission schemes. Which transmission format and which transmissions schemes that is appropriate, and/or suitable, are determined by the first base station 210 depending on the transmission and the CSI. The channel state information may thus be used to efficiently utilize the spectrum efficiency and hence achieve a more reliable communication with higher spectrum efficiency in the wireless communication system 200.

Figure 4:
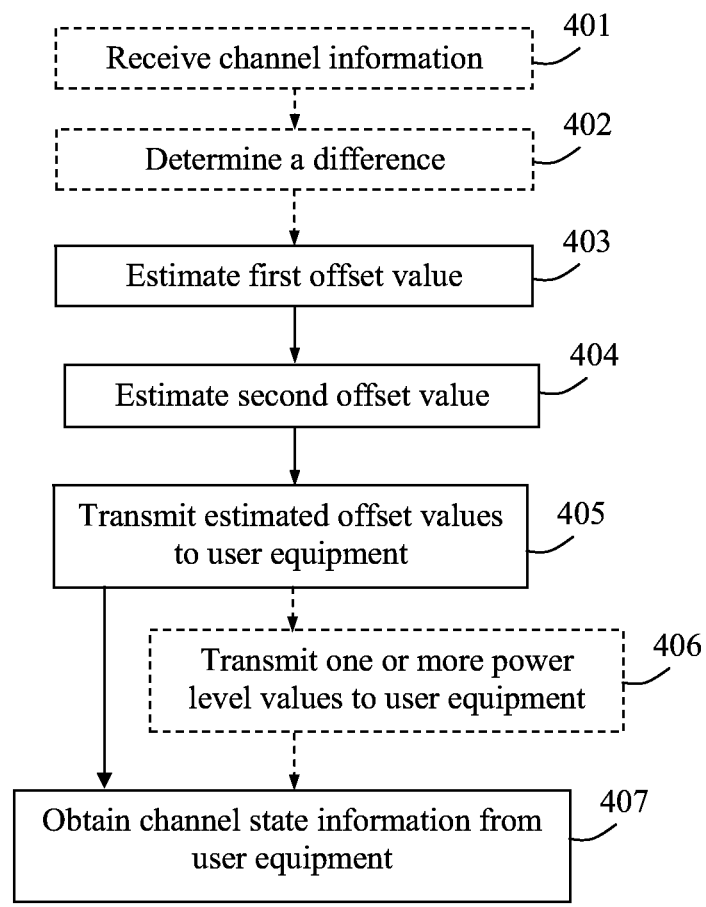
FIG. 4 is a flowchart describing embodiments of methods in a base station.

A method for obtaining channel state information from a user equipment 222 seen from the perspective of the first base station 210, will now be described with reference to the flowchart depicted in FIG. 4. As mentioned above the first base station 210 is comprised in the wireless communication system 200 and the wireless communication system 200 further comprises the user equipment 222. The method comprises the following actions, which actions may as well be carried out in any other suitable order than described below. Actions only performed in some embodiments are marked as dashed boxes.

Action 401

In some embodiments, the wireless communication system 200 further comprises the at least one second base station 212. In these embodiments the first base station 210 receives channel information from the user equipment 222. The channel information may comprise a reference signal value for the first base station 210 and a second reference signal value for the second base station 212. The channel information may be used both as the first channel information and as the second channel information. The reference signal value may be a Reference Signal Received Power (RSRP) value. The RSRP value may indicate a reference signal receiving power for the first base station 210 or for the second base station 212.

Action 402

In some embodiments, the first base station 210 determines a difference between the reference signal value for the first base station 210 received in action 401 and the second reference signal value for the second base station 212 received in action 401. The difference may be used when estimating, in actions 403 and 404 below, the ratio difference between a first SINR measured at reference signals REs and a second SINR measured at PDSCH REs.

Action 403

The first base station 210 estimates a first offset value for a first set of subframes based on a first channel information. The subframes of the first set of subframes are of a first type.

In some embodiments, the first channel information may comprise one or more of: load information, position information, statistics of an outer loop link adaptation operation, reference signal values and other channel information. The reference signal value may be received from a user equipment 222. The reference signal value may alternatively be estimated by the first base station 210. The first channel information may be the same or different channel information as the second channel information in action 404 below.

According to some embodiments, the first base station 210 estimates, for the first set of subframes, the first offset value by estimating a ratio difference between a first SINR measured at reference signals REs, and a second SINR measured at PDSCH REs. The ratio difference may indicate differences in interference in different set of subframes and/or differences in received desired signal power in different set of subframes.

In some embodiments, the first base station 210 estimates the ratio difference by tracking changes of the first SINR and the second SINR for the first set of subframes.

According to some embodiments, the wireless communication system 200 further comprises the at least one second base station 212. In these embodiments, the first base station 210 may be a first pico base station and the second base station 212 may be either a macro base station or a second pico base station. The first base station 210 determines the subframes of the first type by dividing subframes in the first base station 210 into the first type based on an interference pattern of corresponding subframes in at least the second base station 212. The pico base station may receive information comprising the interference pattern from the second base station 212 via backhaul.

In some embodiments, the wireless communication system 200 further comprises at least one second base station 212. In these embodiments the first base station 210 may be a pico base station and the second base station 212 may be a macro base station. The subframes of the first type are subframes in the first base station 210 which are interfered by ABS or RPSF in the second base station 212. ABS are subframes with either reduced transmit power or no transmit power on some physical channels and/or reduced activity. ABS with reduced downlink transmission power may also be called RPSF. The pico base station may receive information comprising the configuration of the ABS or RPSF in the second base station 212 from the second base station 212 via backhaul.

According to some embodiments, the wireless communication system 200 further comprises at least one second base station 212. In these embodiments the first base station 210 may be a macro base station and the second base station 212 may be a pico base station. The subframes of the first type are ABS or RPSF in the first base station 210.

Action 404

The first base station 210 estimates a second offset value for a second set of subframes based on a second channel information. The subframes of the second set of subframes are of a second type.

In some embodiments, the second channel information may comprise one or more of: load information, position information, statistics of an outer loop link adaptation operation, reference signal values and other channel information. The reference signal value may be received from a user equipment 222. The reference signal value may alternatively be estimated by the first base station 210. The second channel information may be the same or different channel information as the first channel information in action 403 above.

According to some embodiments, the first base station 210 estimates, for the second set of subframes, the second offset value by estimating a ratio difference between a SINR measured at reference signals REs, and a second SINR measured at PDSCH REs.

In some embodiments, the first base station 210 estimates the ratio difference by tracking changes of the first SINR and the second SINR for the second set of subframes. The ratio difference may indicate differences in interference in different set of subframes and/or differences in received desired signal power in different set of subframes.

According to some embodiments, the wireless communication system 200 further comprises at least one second base station 212. In these embodiments the first base station 210 may be a first pico base station and the second base station 212 may be either a macro base station or a second pico base station. The first base station 210 determines the subframes of the second type by dividing subframes in the first base station 210 into the second type and into the first type based on an interference pattern of corresponding subframes in at least the second base station 212. The pico base station may receive information comprising the interference pattern from the second base station 212 via backhaul.

In some embodiments, the wireless communication system 200 further comprises at least one second base station 212. In these embodiments the first base station 210 may be a pico base station and the second base station 212 may be a macro base station. The subframes of the second type are subframes in the first base station 210 which are interfered by non-ABS or non-RPSF in the second base station 212. The pico base station may receive information comprising the configuration of the ABS and non-ABS, or RPSF and non-RPSF, in the second base station 212 from the second base station 212 via backhaul.

Alternatively, the first base station 210 may be a macro base station and the second base station 212 may be a pico base station. The subframes of the second type are non-ABS or non-RPSF in the first base station 210. The actions 403 and 404 correspond to action 301 described above.

Action 405

The first base station 210 transmits the first offset value estimated in action 403 and the second offset value estimated in action 404 to the user equipment 222. This action corresponds to action 303 described above.

Figure 6:
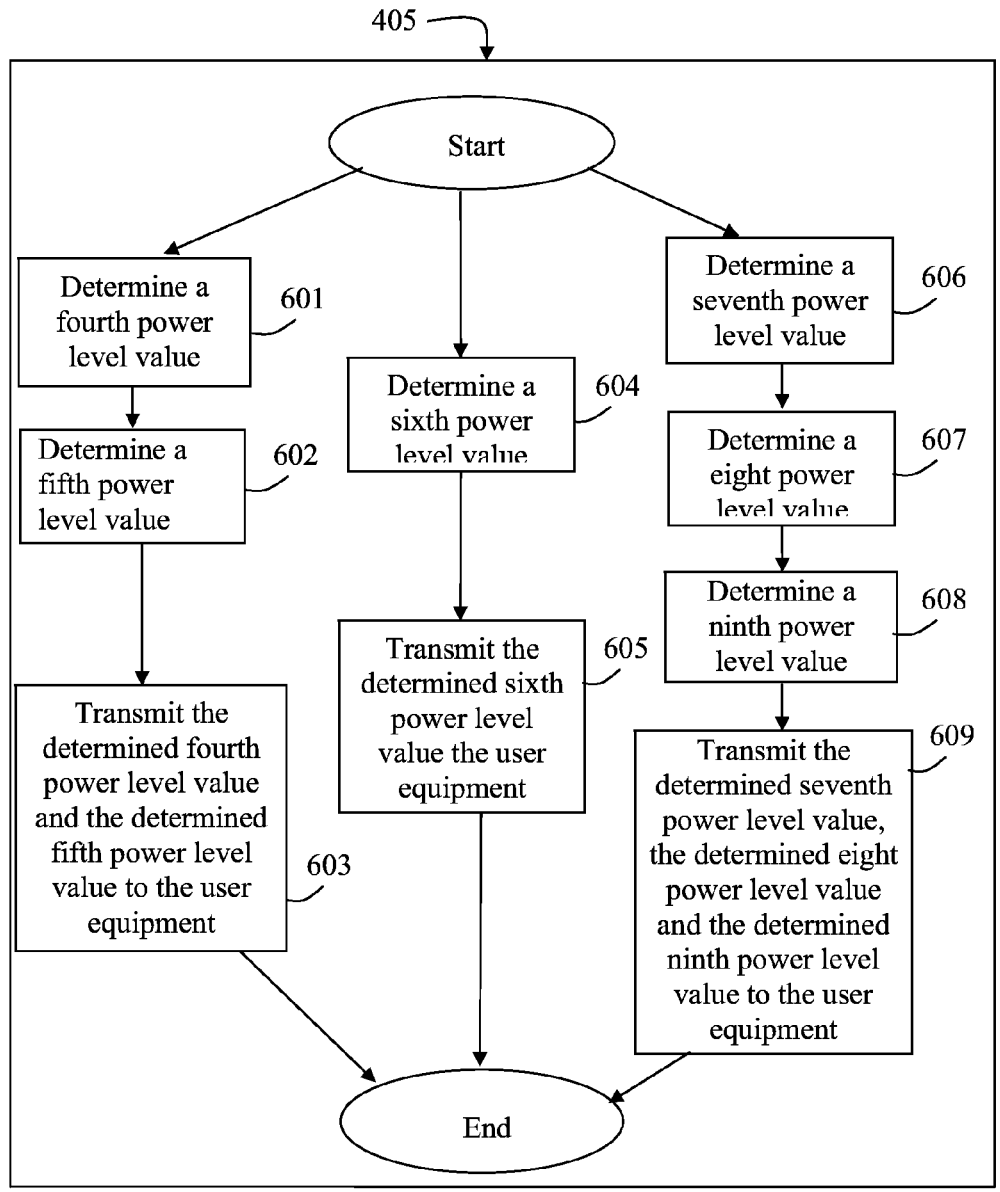
FIG. 6 is a flowchart describing embodiments of method steps in a base station.

In some embodiments, the first base station 210 further performs the actions 601, 602 and 603 described below with reference to the flowchart depicted in FIG. 6.

In some embodiments, the first base station 210 further performs the actions 604 and 605 described below with reference to the flowchart depicted in FIG. 6.

In some embodiments, the first base station 210 further performs the actions 606, 607, 608 and 609 described below with reference to the flowchart depicted in FIG. 6.

Action 406

The first base station 210 may transmit a first power level value to the user equipment 222. The first power level value may indicate an assumed ratio between a power level of PDSCH REs and a power level of CRS REs for both set of subframes.

The first base station 210 may further transmit a second power level value for the first set of subframes and a third power level value for the second set of subframes to the user equipment 222. The second power level value may indicate an assumed ratio between a power level of PDSCH REs and a power level of CRS REs for the first set of subframes. The third power level value may indicate an assumed ratio between the power level of PDSCH REs and the power level of CRS REs for the second set of subframes. The assumed ratio between a power level of PDSCH REs and a power level of CRS REs may be determined according to a channel information configuration in the wireless communication system 200. By transmitting power levels as well as offset values to the user equipment, both interference mismatch and transmit power difference may be taken into consideration when calculating channel state information, described in action 508 below, and thus a more reliable communication with higher spectrum efficiency in the wireless communication system 200 is achieved. How the first power level value, the second power level value and the third power level value may be determined are described further below.

Action 407

The first base station 210 obtains the channel state information from the user equipment 222. The channel state information is based on the estimated first offset value and the estimated second offset value. The channel state information may be used for transmission in the first base station 210. The channel state information may be used to adapt transmission to current channel conditions and thus, more reliable communication with higher spectrum efficiency in the wireless communication system 200 is achieved. This action corresponds to action 306 described above.

The action 405 above will now be further described with reference to the flowchart depicted in FIG. 6. As mentioned above the first base station 210 is comprised in a wireless communication system 200. The wireless communication system 200 further comprises the user equipment 222. The method comprises the following actions, which actions may as well be carried out in any other suitable order than described below.

Action 601

The first base station 210 determines a fourth power level value. The fourth power level value may indicate an assumed ratio between a power level of PDSCH REs and a power level of CSI-RS REs for the first set of subframes. How the fourth power level value may be determined is described further below.

Action 602

The first base station 210 determines a fifth power level value. The fifth power level value may indicate an assumed ratio between a power level of PDSCH REs and a power level of CSI-RS REs for the second set of subframes. The assumed ratio between a power level of PDSCH REs and a power level of CSI-RS REs may be determined according to channel state information configuration in the wireless communication system 200. In some embodiments CSI-RS are transmitted from the first base station 210 to the user equipment 222 and one purpose is to get optimized Modulation and Coding Schemes (MCS) and transmission schemes for PDSCH. The assumed ratio may be used to compensate the difference of power levels between CSI-RS and PDSCH. How the fifth power level value may be determined is described further below.

Action 603

The first base station 210 transmits said fourth power level value, determined in action 601, and said fifth power level value, determined in action 602, to the user equipment 222. The estimated first offset value may be implicitly signaled by the fourth power level value and the estimated second offset value may be implicitly signaled by the fifth power level value. By transmitting power levels, which may implicitly contains the two offset values, to the user equipment, both interference mismatch and transmit power difference may be taken into consideration when calculating channel state information, described in action 508 below, and thus more reliable communication with higher spectrum efficiency in the wireless communication system 200 is achieved.

Action 604

The first base station 210 determines a sixth power level value. The sixth power level value may indicate an assumed ratio between a power level of PDSCH REs and a power level of CSI-RS REs for both sets of subframes. The assumed ratio may be determined as described in action 602 above. How the sixth power level value may be determined is described further below.

Action 605

The first base station 210 transmits said sixth power level value, determined in action 604, to the user equipment 222. The estimated first offset value and the estimated second offset value may be implicitly signaled by the sixth power level value. By transmitting the power level, which may implicitly contain the two offset values, to the user equipment, both interference mismatch and transmit power difference may be taken into consideration when calculating channel state information, described in action 508 below, and thus, more reliable communication with higher spectrum efficiency in the wireless communication system 200 is achieved.

Action 606

The first base station 210 determines a seventh power level value. The seventh power level value may indicate an assumed ratio between a power level of PDSCH REs and a power level of CSI-RS REs for the first set of subframes or for the second set of subframes. The assumed ratio may be determined as described in action 602 above. How the seventh power level value may be determined is described further below.

Action 607

The first base station 210 determines a eight power level value. The eight power level value may indicate an assumed ratio between a power level of PDSCH REs and a power level of CRS REs for the first set of subframes. The assumed ratio may be determined as described in action 602 above. How the eight power level value may be determined is described further below.

Action 608

The first base station 210 determines a ninth power level value. The ninth power level value may indicate an assumed ratio between a power level of PDSCH REs and a power level of CRS REs for the second set of subframes. The assumed ratio may be determined as described in action 602 above. How the ninth power level value may be determined is described further below.

Action 609

The first base station 210 transmits the seventh power level value, determined in action 606, the eight power level value, determined in action 607, and the ninth power level value, determined in action 608, to the user equipment 222. The estimated first offset value may be implicitly signaled by the seventh power level value and the estimated second offset value may be implicitly signaled by the seventh power level value, the eight power level value and the ninth power level value. By transmitting power levels, which implicitly contains the two offset values, to the user equipment 222, both interference mismatch and transmit power difference may be taken into consideration when calculating channel state information, described in action 508 below, and thus, more reliable communication with higher spectrum efficiency in the wireless communication system 200 is achieved.

Figure 7:
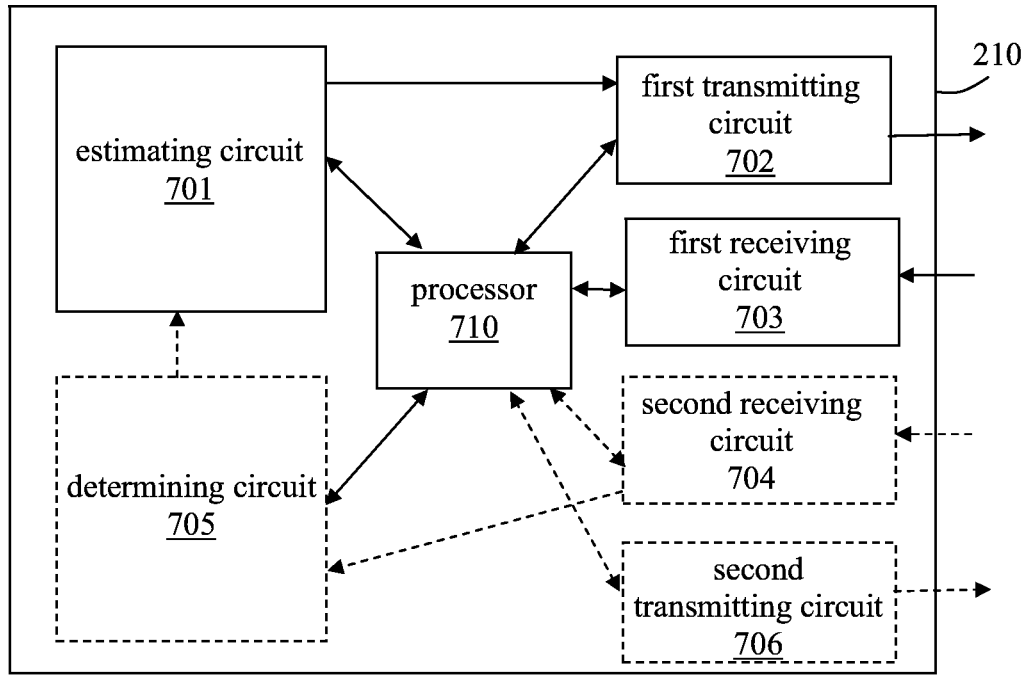
FIG. 7 is a block diagram illustrating a base station.

To perform the method actions for obtaining channel state information from the user equipment 222 described above in relation to FIG. 4 and FIG. 6, the base station 210 comprises the following arrangement depicted in FIG. 7. As mentioned above the first base station 210 is comprised in a wireless communication system 200. The wireless communication system 200 further comprises the user equipment 222. The wireless communication system 200 may further comprise at least the second base station 212.

The first base station 210 comprises an estimating circuit 701 configured to estimate a first offset value for a first set of subframes based on a first channel information, which subframes of the first set of subframes are of a first type and to estimate a second offset value for a second set of subframes based on a second channel information, which subframes of the second set of subframes are of a second type.

The first channel information and/or the second channel information may comprise one or more of: load information, position information, statistics of an outer loop link adaptation operation, reference signal values and other channel information.

The estimating circuit 701 is further configured to estimate the first offset value and to estimate the second offset value by estimating a ratio difference between the first SINR measured at reference signals REs, and the second SINR measured at PDSCH REs for the first subframe type and the second subframe type respectively.

The ratio difference may be estimated by tracking changes of the first SINR and the second SINR for the first set of subframes and for the second set of subframes separately.

The wireless communication system 200 may further comprises at least one second base station 212, and the first base station 210 may be a first pico base station and the second base station may be either a macro base station or a second pico base station. The subframes of the first type and the subframes of the second type are determined by dividing subframes in the first base station 210 into the first and second type based on an interference pattern of corresponding subframes in at least the second base station 212.

The first base station 210 may be a pico base station and the second base station 212 may be a macro base station. The subframes of the first type are subframes in the first base station 210 which are interfered by ABS or RPSF in the second base station 212, and wherein the subframes of the second type are subframes in the first base station 210 which are interfered by non-ABS or non-RPSF in the second base station 212.

The first base station 210 may be a macro base station and the second base station 212 may be a pico base station. The subframes of the first type are ABS or RPSF in the first base station 210 and the subframes of the second type are non-ABS or non-RPSF in the first base station 210.

The first base station 210 further comprises a first transmitting circuit 702 configured to transmit the estimated first offset value for the first set of subframes and the estimated second offset value for the second set of subframes to the user equipment 222.

The first transmitting circuit 702 may be further configured to determine a fourth power level value. The fourth power level value may indicate an assumed ratio between a power level of PDSCH REs and a power level of CSI-RS REs for the first set of subframes.

The first transmitting circuit 702 may be further configured to determine a fifth power level value. The fifth power level value may indicate an assumed ratio between a power level of PDSCH REs and a power level of CSI-RS REs for the second set of subframes.

The first transmitting circuit 702 may be further configured to transmit said determined fourth power level value and said determined fifth power level value to the user equipment 222. The estimated first offset value may implicitly be signaled by the fourth power level value and the estimated second offset value may implicitly be signaled by the fifth power level value.

The first transmitting circuit 702 may be further configured to determine a sixth power level value. The sixth power level value may indicate an assumed ratio between a power level of PDSCH REs and a power level of CSI-RS REs for both sets of subframes.

The first transmitting circuit 702 may be further configured to transmit said determined sixth power level value to the user equipment 222. The estimated first offset value and the estimated second offset value may be implicitly signaled by the sixth power level value.

The first transmitting circuit 702 may be further configured to determine a seventh power level value. The seventh power level value may indicate an assumed ratio between a power level of PDSCH REs and a power level of CSI-RS REs for the first set of subframes or for the second set of subframes.

The first transmitting circuit 702 may be further configured to determine a eight power level value. The eight power level value may indicate an assumed ratio between a power level of PDSCH REs and a power level of CRS REs for the first set of subframes.

The first transmitting circuit 702 may be further configured to determine a ninth power level value. The ninth power level value may indicate an assumed ratio between a power level of PDSCH REs and a power level of CRS REs for the second set of subframes.

The first transmitting circuit 702 may be further configured to transmit said determined seventh power level value, the eight power level value and the ninth power level value to the user equipment 222. The estimated first offset value may implicitly be signaled by the seventh power level value and the estimated second offset value may implicitly be signaled by the seventh power level value, the eight power level value and the ninth power level value.

The first base station 210 further comprises a first receiving circuit 703 configured to obtain channel state information from the user equipment 222. The channel state information may be based on the estimated first offset value and the estimated second offset value. The channel state information may be used for transmission in the first base station 210.

In some embodiments, the first base station 210 further comprises a second receiving circuit 704 configured to receive channel information from the user equipment 222. The channel information may comprise a reference signal value for the first base station 210 and a second reference signal value for the second base station 212. The channel information may be used both as the first channel information and as the second channel information. The reference signal value may be a RSRP value. The RSRP value may indicate a reference signal receiving power for the first base station 210 or for the second base station 212.

In some embodiments, the first base station 210 further comprises a determining circuit 705 configured to determine a difference between the reference signal value for the first base station 210 and the second reference signal value for the second base station 212. The difference may be used when estimating the ratio difference between the first SINR measured at reference signals REs and the second SINR measured at PDSCH REs.

In some embodiments, the first base station 210 further comprises a second transmitting circuit 706 which may be configured to transmit a first power level value to the user equipment 222. The first power level value may indicate an assumed ratio between a power level of PDSCH REs and a power level of CRS REs for both set of subframes.

The second transmitting circuit 706 may be further configured to transmit a second power level value for the first set of subframes and a third power level value for the second set of subframes to the user equipment 222. The second power level value may indicate an assumed ratio between a power level of PDSCH REs and a power level of CRS REs for the first set of subframes and the third power level value may indicate an assumed ratio between the power level of PDSCH REs and the power level of CRS REs for the second set of subframes.

The embodiments herein for obtaining channel state information may be implemented through one or more processors, such as a processor 710 in the first base station 210 depicted in FIG. 7, together with computer program code for performing the functions and actions of the embodiments herein. The program code mentioned above may also be provided as a computer program product, for instance in the form of a data carrier carrying computer program code for performing the embodiments herein when being loaded into the first base station 210. One such carrier may be in the form of a CD ROM disc. It is however feasible with other data carriers such as a memory stick. The computer program code may furthermore be provided as pure program code on a server and downloaded to the first base station 210.

Those skilled in the art will also appreciate that the estimating circuit 701, the first transmitting circuit 702, the first receiving unit 703, the second receiving circuit 704, the determining circuit 705, and the second transmitting circuit 706 described above may refer to a combination of analog and digital circuits, and/or one or more processors configured with software and/or firmware e.g., stored in memory that, when executed by the one or more processors such as the processor 710, perform as described above. Those skilled in the art may also appreciate that the first transmitting circuit 702 and the second transmitting circuit 706 may be configured in the same circuit. Those skilled in the art may also appreciate that the first receiving circuit 703 and the second receiving circuit 704 may be configured in the same circuit. One or more of these processors, as well as the other digital hardware, may be included in a single application-specific integrated circuit ASIC, or several processors and various digital hardware may be distributed among several separate components, whether individually packaged or assembled into a system-on-a-chip SoC.

Figure 5:
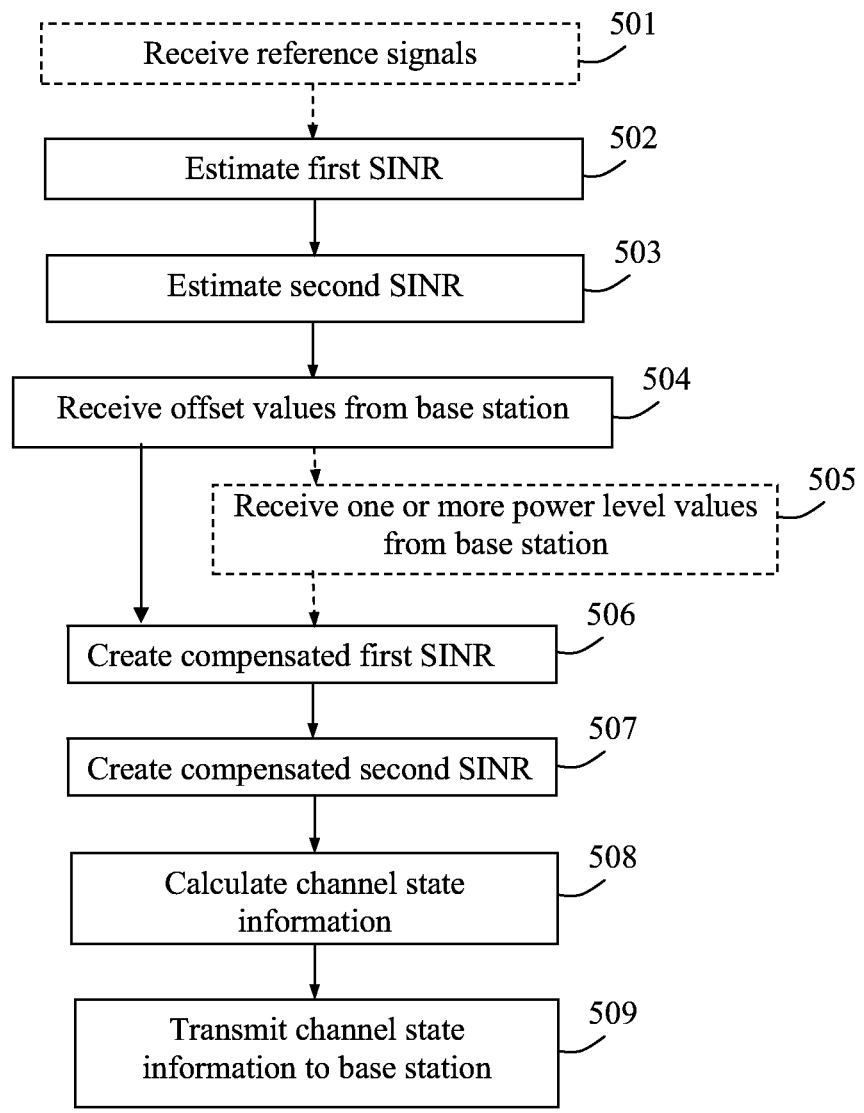
FIG. 5 is a flowchart describing embodiments of method in a user equipment.

A method for transmitting channel state information to the first base station 210 seen from the perspective of the user equipment 222, will now be described with reference to the flowchart depicted in FIG. 5. As mentioned above the user equipment 222 is comprised in a wireless communication system 200. The wireless communication system 200 further comprises the first base station 210. The method comprises the following actions, which actions may as well be carried out in any other suitable order than described below.

Action 501

In some embodiments, the user equipment 222 receives reference signals for subframes of a first type and reference signals for subframes of a second type from the first base station 210, and the reference signals may be CRS or CSI-RS.

Action 502

The user equipment 222 estimates a first SINR, based on reference signals for subframes of a first type.

In some embodiments, the user equipment 222 use the reference signals for subframes of the first type and reference signals for subframes of a second type for estimating one or more of a channel impulse response, an interference and a noise level. In those embodiments the user equipment 222 estimates the first SINR based on said estimations of one or more of channel impulse response, interference and noise level.

Action 503

The user equipment 222 estimates a second SINR, based on reference signals for subframes of a second type.

In some embodiments, the user equipment 222 use the reference signals for subframes of the first type and the reference signals for subframes of the second type for estimating one or more of a channel impulse response, an interference and a noise level. In those embodiments the user equipment 222 estimates a second SINR based on said estimations of one or more of channel impulse response, interference and noise level.

Actions 502 and 503 corresponds to action 302 described above.

Action 504

The user equipment 222 receives a first offset value for subframes of the first type and a second offset value for the second type of subframes from the first base station 210. In some embodiments, the user equipment 222 receives a fourth power level value and a fifth power level value. The fourth power level value may implicitly comprise the first offset value for the subframes of the first type, and the fifth power level value may implicitly comprise the second offset value for the subframes of the second type.

In some embodiments, the user equipment 222 receives a sixth power level value. The sixth power level value may implicitly comprise the first offset value for the subframes of the first type and the second offset value for subframes of a second type.

In some embodiments, the user equipment 222 receives a seventh power level value, an eight power level value and a ninth power level value. The seventh power level value may implicitly comprise the first offset value for the subframes of the first type and the seventh power level value, the eight power level value and the ninth power level value may implicitly comprise the second offset value for subframes of a second type.

In some embodiments, the wireless communication system 200 further comprises at least one second base station 212. In those embodiments, the first base station 210 may a pico base station and the second base station 212 may be a macro base station. The subframes of the first type and the subframes of the second type are different types of subframes in the first base station 210. The subframes in the first base station 210 are interfered by subframes in a second base station 212. The subframes of a first type are subframes that are interfered by ABS or RPSF and the subframes of a second type are interfered by non-ABS or non-RPSF.

In some embodiments, the wireless communication system 200 may further comprise at least one second base station 212. In those embodiments, the first base station 210 may be a macro base station and the second base station 212 may be a pico base station. The subframes of the first type and the subframes of the second type are different types of subframes in the first base station 210. The subframes of the first type are ABS or RPSF in the first base station 210 and the subframes of the second type are non-ABS or non-RPSF, in the first base station 210. This action corresponds to action 303 described above.

Action 505

In some embodiments, the user equipment 222 receives a first power level value from the first base station 210.

In some embodiments, the user equipment 222 receives a second power level value for subframes of a first type and a third power level value for subframes of a second type from the first base station 210.

Action 506

The user equipment 222 creates a compensated first SINR based on the first SINR, estimated in action 502, and the first offset value, received in action 504.

In some embodiments, the user equipment 222 creates the compensated first SINR further based on said first power level value, received in action 505.

In some embodiments, the user equipment 222 creates the compensated first SINR further based on the second power level value, received in action 505.

In some embodiments, the user equipment 222 creates the compensated first SINR further based on the fourth power level value, received in action 504.

In some embodiments, the user equipment 222 creates the compensated first SINR further based on said sixth power level value, received in action 504.

In some embodiments, the user equipment 222 creates the compensated first SINR further based on the seventh power level value, received in action 504.

This action corresponds to action 304 described above.

Action 507

The user equipment 222 creates a compensated second SINR based on the second SINR, estimated in action 503, and the second offset value, received in action 504.

In some embodiments, the user equipment 222 creates the compensated second SINR further based on said first power level value, received in action 505.

In some embodiments, the user equipment 222 creates the compensated second SINR further based on the third power level value, received in action 505.

In some embodiments, the user equipment 222 creates the compensated second SINR further based on the fifth power level value, received in action 504.

In some embodiments, the user equipment 222 creates the compensated second SINR further based on said sixth power level value, received in action 504.

In some embodiments, the user equipment 222 creates the compensated second SINR further based on the seventh power level value, the eight power level value and the ninth power level value, received in action 504.

This action corresponds to action 304 described above.

Action 508

The user equipment 222 calculates channel state information based on said compensated first SINR, created in action 507, and said compensated second SINR, created in action 507.

In some embodiments, the channel state information comprises at least one of CQI, PMI and RI, and the user equipment calculates the CQI, PMI and RI based on one or more of a channel impulse response, estimated in action 502, an interference, estimated in action 502, a noise level, estimated in action 502, the compensated first SINR, created in action 506, and the compensated second SINR, created in action 506.

More accurate channel state information is calculated since the calculation is based on the compensated first SINR and the compensated second SINR and thus, a more reliable communication with higher spectrum efficiency in the wireless communication system 200 is achieved.

This action corresponds to action 305 described above.

Action 509

The user equipment 222 transmits the channel state information, calculated in action 508, to the first base station 210.

This action corresponds to action 306 described above.

Figure 8:
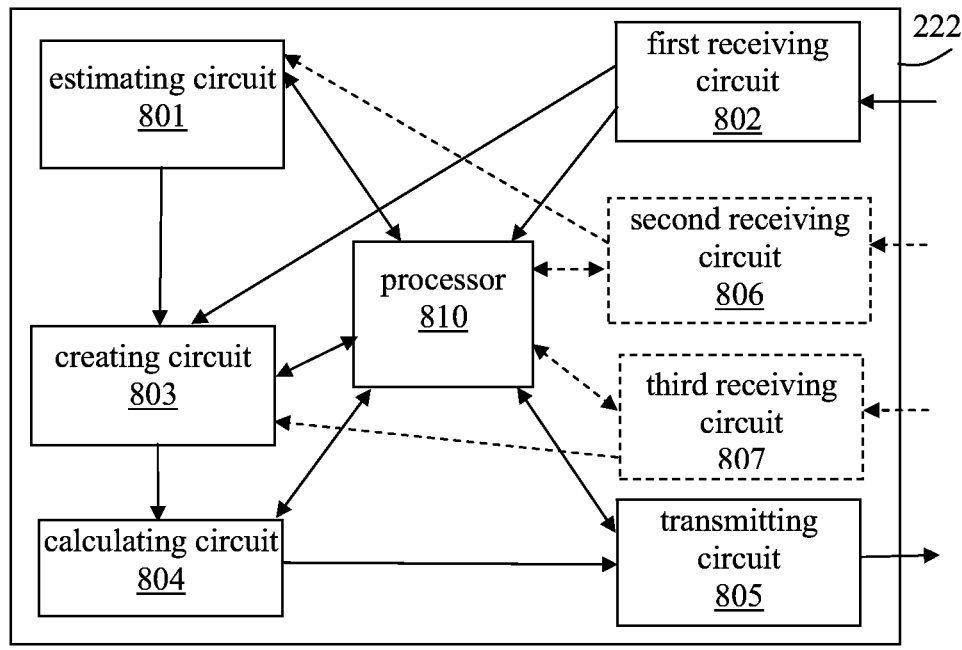
FIG. 8 is a block diagram illustrating a user equipment.

To perform the method actions for transmitting channel state information to a first base station 210 described above in relation to FIG. 5, the user equipment 222 comprises the following arrangement depicted in FIG. 8. As mentioned above the user equipment 222 is comprised in a wireless communication system 200. The wireless communication system 200 further comprises the first base station 210. The wireless communication system 200 may further comprise at least the second base station 212.

The user equipment 222 comprises an estimating circuit 801 configured to estimate the first SINR based on reference signals for subframes of a first type and to estimate the second SINR based on reference signals for subframes of a second type.

The reference signals for subframes of the first type and the reference signals for subframes of the second type may be used for estimating one or more of a channel impulse response, an interference and a noise level, and the estimating circuit 801 may further be configured to estimate a first SINR and a second SINR based on said estimations of one or more of channel impulse response, interference and noise level.

The user equipment 222 further comprises a first receiving circuit 802 configured to receive a first offset value for subframes of a first type and to receive a second offset value for a second type of subframes from the first base station 210.

In some embodiments, the first receiving circuit 802 is further configured to receive a fourth power level value and a fifth power level value. The fourth power level value may implicitly comprise the first offset value for the subframes of the first type. The fifth power level value may implicitly comprise the second offset value for the subframes of the second type.

In some embodiments, the first receiving circuit 802 is further configured to receive a sixth power level value, the sixth power level value may implicitly comprise the first offset value for the subframes of the first type and the second offset value for subframes of a second type.

In some embodiments, the first receiving circuit 802 is further configured to receive a seventh power level value, a eight power level value and a ninth power level value. The seventh power level value may implicitly comprise the first offset value for the subframes of the first type. The seventh power level value, eight power level value and ninth power level value may implicitly comprise the second offset value for subframes of a second type.

In some embodiments, the wireless communication system 200 further comprises at least one second base station 212. The first base station 210 may be a pico base station and the second base station 212 may be a macro base station. The subframes of the first type and the subframes of the second type are different types of subframes in the first base station 210 which are interfered by subframes in a second base station 212. The subframes of a first type are subframes that are interfered by ABS or RPSF and the subframes of a second type are subframes that are interfered by non-ABS or non-RPSF.

In some embodiments, the wireless communication system 200 further comprises at least one second base station 212. The first base station 210 may be a macro base station and the second base station 212 may be a pico base station. The subframes of the first type and the subframes of the second type are different types of subframes in the first base station 210. The subframes of the first type are ABS or RPSF in the first base station 210 and the subframes of the second type are non-ABS or non-RPSF in the first base station 210.

The user equipment 222 further comprises a creating circuit 803 configured to create a compensated first SINR based on the estimated first SINR and the received first offset value and to create a compensated second SINR based on the estimated second SINR and the received second offset value.

In some embodiments, the creating circuit 803 is further configured to create the compensated first SINR and create the compensated second SINR further based on a received first power level value from the first base station 210.

In some embodiments, the creating circuit 803 is further configured to create the compensated first SINR further based on the received second power level value, and to create the compensated second SINR further based on a received third power level value from the base station 210.

In some embodiments, the creating circuit 803 is further configured to create the compensated first SINR further based on a received fourth power level value, and to create the compensated second SINR further based on a received fifth power level value.

In some embodiments, the creating circuit 803 is further configured to create the compensated first SINR and the compensated second SINR further based on a received sixth power level value.

In some embodiments, the creating circuit 803 is further configured to create the compensated first SINR further based on a received seventh power level value, and to create the compensated second SINR further based on a received seventh power level value, a received eight power level value and a received ninth power level value.

The user equipment 222 further comprises a calculating circuit 804 configured to calculate channel state information based on said created compensated first SINR and said created compensated second SINR.

In some embodiments, the channel state information comprises at least one of CQI, PMI and RI, and the calculating circuit 804 is configured to calculate the CQI, PMI and RI based on one or more of an estimation of channel impulse response, an estimation of interference, an estimation of noise level, a created compensated first SINR and a created compensated second SINR.

The user equipment 222 further comprises a transmitting circuit 805 configured to transmit the calculated channel state information to the first base station 210.

In some embodiments, the user equipment 222 further comprises a second receiving circuit 806 configured to receive the reference signals for subframes of the first type and the reference signals for subframes of the second type from the first base station 210. The received reference signals may be CRS or CSI-RS.

In some embodiments, the user equipment 222 further comprises a third receiving circuit 807 configured to receive a first power level value from the first base station 210.

In some embodiments, the third receiving circuit 807 is further configured to receive a second power level value for subframes of a first type and a third power level value for subframes of a second type from the first base station 210.

The embodiments herein for obtaining channel state information may be implemented through one or more processors, such as a processor 810 in the user equipment 222 depicted in FIG. 8, together with computer program code for performing the functions and actions of the embodiments herein. The program code mentioned above may also be provided as a computer program product, for instance in the form of a data carrier carrying computer program code for performing the embodiments herein when being loaded into the user equipment 222. One such carrier may be in the form of a CD ROM disc. It is however feasible with other data carriers such as a memory stick. The computer program code may furthermore be provided as pure program code on a server and downloaded to the user equipment 222.

Those skilled in the art will also appreciate that the estimating circuit 801, the first receiving circuit 802, the creating circuit 803, the calculating circuit 804, the transmitting circuit 805, the second receiving circuit 806 and the third receiving circuit 807 described above may refer to a combination of analog and digital circuits, and/or one or more processors configured with software and/or firmware e.g., stored in memory that, when executed by the one or more processors such as the processor 810, perform as described above. Those skilled in the art will also appreciate that the first receiving circuit 802, the second receiving circuit 806 and the third receiving circuit 807 may be configured in the same circuit. One or more of these processors, as well as the other digital hardware, may be included in a single application-specific integrated circuit ASIC, or several processors and various digital hardware may be distributed among several separate components, whether individually packaged or assembled into a system-on-a-chip SoC.

Action 403 and 404 above is related to estimating the first offset value and the second offset value in the first base station 210. Below is an example of how these offset values may be estimated. In this example the first offset value is $\Delta_{offset\_0}$ and the second offset value is $\Delta_{offset\_1}$. The subframes of a first type may also be referred to as CSI_0 subframes and the subframes of a second type may also be referred to as CSI_1 subframes.

In this example, for subframes of a first type and subframes of a second type, we may use two sets of Outer Loop Link Adaptation (OLLA) one is for the first type and subframes and one is for the subframes of a second type. In the first base station 210, the Signal to Interference and Noise Ratio (SINR) may be compensated as:

$$SINR_{Compensated} = SINR_{hypothetical} - A_{offset}$$

Where $A_{offset} = A_{offset} + A_{StepUp}$ when negative acknowledgement, NACK, is received.

$A_{offset} = A_{offset} - A_{StepDown}$ when acknowledgement, ACK, is received.

where $A_{StepDown}$ and $A_{StepUp}$ is decided based on a targeted Block Error Rate (BLER);

$SINR_{hypothetical}$ may be obtained based on a feedback CQI. If the interference measured at reference signal is the same as that measured at data, i.e. PDSCH, Resource Elements, REs, the average of $A_{offset}$ is equal to zero. Otherwise, the average of $A_{offset}$ may reflect the difference of interference between the experienced interference at the reference signal and at the data, i.e. PDSCH, REs.

Since the interference pattern may be different for subframes of a first type and subframes of a second type we need to track the SINR change separately for subframes of a first type and for subframes of a second type. For example, we may use $CQI_0$, $A_{offset\_0}$, $SINR_{hypothetical\_0}$, $SINR_{copensated\_0}$, $A_{StepDown\_0}$ and $A_{StepUp\_0}$ to capture the SINR change for CSI_0 subframes, i.e. subframes of a first type. Accordingly, we may use $CQI_1$, $A_{offset\_1}$, $SINR_{hypothetical\_1}$, $SINR_{copensated\_1}$, $A_{StepDown\_1}$ and $A_{StepUp\_1}$ to track the SINR change for CSI_1 subframes, i.e. subframes of a second type.

Due to that the mismatch level in CSI_0 subframes and CSI_1 subframes are different, the average value of $A_{offset\_0}$ in CSI_0 subframes, named $\overline{A}_{offset\_0}$, will be different from the average value of $A_{offset\_1}$ in CSI_1 subframes, named $\overline{A}_{offset\_1}$. The first offset value may be set equal to the average value of $A_{offset\_0}$ in CSI_0 subframes, i.e. $\Delta_{offset\_0} = \overline{A}_{offset\_0}$ and the second offset value may be set equal to the average value of $A_{offset\_1}$ in CSI_1 subframes, i.e. $\Delta_{offset\_1} = \overline{A}_{offset\_1}$. This example may be applied both in scenarios when the CRS are colliding and when the CRS are not colliding.

As a further example, for scenarios when CRS are colliding, in order to accelerate the converge of $\overline{A}_{offset\_0}$, we may set the initial value $A_{offset\_0}$ to the RSRP difference between macro base station, e.g. the second base station 212, and pico base station e.g. the first base station 210, rather than to set its initial value to zero. The RSRP difference is determined by determining the difference between the RSRP value for the macro base station and the RSRP value for the pico base station. The macro base station may alternatively be the first base station 210 and the pico base station may alternative be the second base station 212. As a further example, for scenarios when CRS are non-colliding and in order to accelerate the converge of $\overline{A}_{offset\_0}$, one or more RSRP values may be used when setting the initial value $A_{offset\_0}$. In this example the initial value $A_{offset\_0}$ may be set as a function of one or more RSRP values. To use the RSRP values to accelerate the converge of $\overline{A}_{offset\_0}$ is very beneficial for small packets and when user equipments 222 is moving fast.

Action 406 above is related to transmitting the estimated first offset value, $\Delta_{offset\_0}$, and the estimated second offset value, $\Delta_{offset\_1}$, to the user equipment. Below are examples of how the different embodiments described in action 406 may be performed.

If the reference signal is CRS and it is used for channel measurements and the first base station 210 is a pico base station, $\Delta_{offset\_0}$ and $\Delta_{offset\_1}$ may be explicitly signaling together with a first power level value, $P_A$, which is a parameter signaled by higher layers and it reflects the ratio of PDSCH Energy Per Resource Element (EPRE) to cell-specific reference signals EPRE among PDSCH REs. Since the first base station 210 is a pico base station, PeNB, $P_A$ is used for all the subframes, i.e. all subframes have the same power level in a pico base station. By transmitting a power level value as well as offset values, both interference mismatch and transmit power difference may be taken into consideration when calculating channel state information in the user equipment.

If the reference signal is CRS and it is used for channel measurements and the first base station 210 is a macro base station, MeNB, two different ratios for RPSF (reduced power subframes) and non-RPSF may be used. The two different ratios may be referred to as a second power level value, $P_{A0}$, and a third power level value $P_{A1} \cdot \Delta_{offset\_0}$ and $\Delta_{offset\_1}$ may be explicitly signaling together with the second power level value, $P_{A0}$, and the third power level value, $P_{A1}$. The second power level value indicates an assumed ratio between a power level of PDSCH REs, and a power level of CRS REs for the first set of subframes and the third power level value indicates an assumed ratio between the power level of PDSCH REs and the power level of CRS REs for the second set of subframes. By transmitting power levels as well as offset values, both interference mismatch and transmit power difference may be taken into consideration when calculating channel state information in the user equipment.

Actions 601-609 above is related to transmitting the estimated first offset value, $\Delta_{offset\_0}$ and the estimated second offset value, $\Delta_{offset\_1}$, implicitly to the user equipment. Below are examples of how the different embodiments described in actions 601-609 may be performed. If the reference signal is CSI-RS and it is used for channel measurements, $\Delta_{offset\_0}$ and $\Delta_{offset\_1}$ are not explicitly signaled.

In relation to actions 601-603 described above, two power level values are signaled for CSI_0 subframes and CSI_1 subframes, i.e. a fourth power level value, $P_{C0}$, and a fifth power level value, $P_{C1}$. Actions 601-603 are applicable both when the first base station 210 is a pico base station and when it is a macro base station. When a user equipment derives channel state information feedback in CSI_0 subframes, the fourth power level value is used. Otherwise, the fifth power level value is used. Here, $P_{C0}$, and $P_{C1}$ are determined by $\Delta_{offset\_0}$ and $\Delta_{offset\_1}$, respectively. For example, $P_{C0} = \Delta_{offset\_0}$ and $P_{C1} = \Delta_{offset\_1}$. $P_{C0}$ is the assumed ratio of PDSCH EPRE to CSI-RS EPRE for subframes of a first type, CSI_0 subframes, when the user equipment derives channel state information feedback. And $P_{C1}$ is the assumed ratio of PDSCH EPRE to CSI-RS EPRE for subframes of a second type, CSI_1 subframes, when the user equipment derives channel state information feedback. By transmitting the power levels, which implicitly contains the two offset values, to the user equipment, both interference mismatch and transmit power difference may be taken into consideration when calculating channel state information in the user equipment.

In relation to actions 604-605 described above, a sixth power level value, $P_C$, may be determined. Actions 604-605 is related to when the first base station 210 is a pico base station.

The sixth power level value is the assumed ratio of PDSCH EPRE to CSI-RS EPRE when user equipment derives channel state information feedback. The sixth power level value implicitly contains both $\Delta_{offset\_0}$ and $\Delta_{offset\_1}$. For pico user equipment $P_C$ may be used directly in either the subframes of the first type or in the subframes of the second type. By transmitting the power level, which implicitly contains the two offset values, to the user equipment, both interference mismatch and transmit power difference may be taken into consideration when calculating channel state information in the user equipment.

In relation to actions 606-609 described above, a seventh power level value, $P_D$ a eight power level value, $P_{A0}$ and a ninth power level value, $P_{A1}$ is determined. Actions 606-609 above is related to when the first base station 210 is a macro base station. For macro user equipment, $P_D$ is the ratio of PDSCH EPRE to CSI-RS EPRE when the user equipment derives channel state information feedback in non-RPSF (or RPSF subframe). Hence, when user equipment derives channel state information feedback for non-RPSF (or RPSF subframe), $P_D$ may be directly used. When user equipment derives channel state information feedback for RPSF (non-RPSF subframe), the user equipment shall first derive the ratio based on $P_{A0}$, $P_{A1}$ and $P_D$. For example, the value that is used in the user equipment to make the SINR compensation may be equal to $P_{A0}-P_{A1}+P_D$ or $P_{A1}-P_{A0}+P_D$. Here, $P_D$ is determined by $\Delta_{offset\_1}$ or $\Delta_{offset\_0}$ i.e., $P_D=\Delta_{offset\_0}$ or $P_D=\Delta_{offset\_1}$. Thus, the seventh power level value may be determined for either the first set of subframes or for the second set of subframes.

Action 502-508 above is related to calculating the channel state information in the user equipment 222. Below are different examples of how this may be performed. In these examples the subframes of a first type may also be referred to as CSI_0 subframes and the subframes of a second type may also be referred to as CSI_1 subframes.

Action 502 and 504 above describes that a first SINR and a second SINR is estimated. Below is an example of how to estimate those SINRs:

From CSI-RS or CRS, user equipment 222 may estimate the channel impulse response H and the interference I and noise level σ. With H, I, and σ, we may obtain the estimated SINR by:

$$SINR_{est}^{(UE)}=f(H,I,\sigma)$$

where $f(\cdot)$ is a function. The function is decided by the channel estimation algorithm and receiver algorithm. For CSI_0 subframes and CSI_1 subframes, the estimated SINR is different, denoted by $SINR_{est0}^{(UE)}$ and $SINR_{est1}^{(UE)}$.

Actions 506 and 507 above describes that the user equipment 222 creates a compensated first SINR and a compensated second SINR. Below is an example of how this may be performed.

When the user equipment is a pico user equipment, i.e. the user equipment is served by a pico base station, the pico user equipment may see that PDSCH and reference signal use the same power for all the subframes, but may also see that there are different interference in CSI_0 subframes and CSI_1 subframes. When the user equipment is a macro user equipment, i.e. the user equipment is served by a macro base station; the macro user equipment may see that PDSCH and reference signal uses different power for RPSF and non-RPSF and that there may be different interference as well. Hence, the SINR compensation is different. Hence, in the following examples, we use separate section to describe the SINR compensation for pico user equipment and macro user equipment, separately.

Example of SINR Compensation in Pico User Equipment:

According to the characteristic of reference signal, it is divided into two subsections below to discuss SINR compensation. One subsection is to discuss the compensation when CRS is used, and one subsection is to discuss the compensation when CSI-RS is used. From compensation point of view, since the signaling may be different, the compensation is different accordingly.

SINR Compensation in Pico User Equipment when CRS is Used:

For channel state information calculation in CSI_0 subframes, i.e. subframes of the first type, the ratio of PDSCH EPRE to cell-specific reference signals EPRE, $\rho_{A0}$, may be assumed to be:

$\rho_{A0}=P_A+\Delta_{offset\_0}+10\log 10(2)$ dB for any modulation scheme, if the user equipment is configured with transmission mode 2 with 4 cell-specific antenna ports, or transmission mode 3 with 4 cell-specific antenna ports and the associated RI is equal to one.

$\rho_{A0}=P_A+\Delta_{offset\_0}$ dB for any modulation scheme and any number of layers, otherwise.

For channel state information calculation in CSI_1 subframes, i.e. subframes of the second type, the ratio of PDSCH EPRE to cell-specific reference signals EPRE, $\rho_{A1}$, shall be assumed to be:

$\rho_{A1}=P_A+\Delta_{offset\_1}+10\log 10(2)$ dB for any modulation scheme, if the user equipment is configured with transmission mode 2 with 4 cell-specific antenna ports, or transmission mode 3 with 4 cell-specific antenna ports and the associated RI is equal to one.

$\rho_{A1}=P_A+\Delta_{offset\_1}$ dB for any modulation scheme and any number of layers, otherwise.

$P_A$, is a parameter singling by higher layers and it reflects the ratio of Physical Downlink shared channel, PDSCH, Energy Per Resource Element EPRE to cell-specific reference signals EPRE among PDSCH REs. $P_A$ is the first power level value transmitted from the first base station 210 as described above.

It should be noted that the transmission power of CRS and PDSCH is the same for all subframes. Hence, $P_A$ is the same for CSI_0 subframes and CSI_1 subframes. The compensated SINR may be given by $SINR_{compensated}^{(UE)}=g1(H,I,\sigma,\rho_A)$ where $g1(\cdot)$ is a function. For example, $g1(\cdot)$ may be given by: $g1(H,I,\sigma,\rho_A)=\rho_{A0}f(H,I,\sigma)$ Hence, the compensated SINRs in CSI_0 subframes $SINR_{compensated}^{(UE)}$ may be given by $$SINR_{compensated0}^{(UE)}=\rho_{A0}SINR_{est0}^{(UE)}$$

And the compensated SINRs in CSI_1 subframes may be given by $$SINR_{compensated1}^{(UE)}=\rho_{A1}SINR_{est1}^{(UE)}$$

SINR Compensation in Pico User Equipment when CSI-RS is Used:

When CSI-RS is used, the compensated SINR in CSI_0 subframes and CSI_1 subframes may be given by:

$$SINR_{compensated0}=g_3(H,I,\sigma,\rho_{c0})$$

$$SINR_{compensated1}=g_4(H,I,\sigma,\rho_{c1})$$

where $g_3(\cdot)$ and $g_4(\cdot)$ is a function. For example, $g_3(\cdot)$ and $g_4(\cdot)$ may be given by:

$$g_3(H,I,\sigma,\rho_A)=P_{c0}f(H,I,\sigma)$$

$$g_4(H,I,\sigma,\rho_A)=P_{c1}f(H,I,\sigma)$$

Hence, the compensated SINRs in CSI_0 subframes $SINR_{compensated}^{(UE)}$ may be given by $$SINR_{compensated0}^{(UE)}=P_{c0}SINR_{est0}^{(UE)}$$

And the compensated SINRs in CSI_1 subframes may be given by $$SINR_{compensated1}^{(UE)} = P_{c1} SINR_{est1}^{(UE)}$$

$P_{C0}$ is the fourth power level value and $P_{C1}$ is the fifth power level value and they are transmitted from the first base station 210 as described above.

When CSI-RS are used, the compensated SINR in CSI_0 subframes and CSI_1 subframes may alternatively be given by:

$$SINR_{compensated0}^{(UE)} = P_c SINR_{est0}^{(UE)}$$

$$SINR_{compensated1}^{(UE)} = P_c SINR_{est1}^{(UE)}$$

$P_C$ is the sixth power level value which is transmitted from the first base station 210 as described above.

Example of SINR Compensation in Macro User Equipment:

Similar as the SINR compensation in the pico user equipment, we also use two subsections below to describe the SINR compensation in macro user equipment according to the reference signal used.

SINR Compensation in the Macro User Equipment when CRS is Used:

For macro user equipment RPSF (Reduced Power Sub-Frames) may be configured. When channel state information is calculated in RPSF, the ratio of PDSCH EPRE to cell-specific reference signals EPRE shall be assumed to be:

- $\rho_{A1} = P_{A0} + \Delta_{offset\_0} + 10 \log 10(2)$ dB for any modulation scheme, if the user equipment is configured with transmission mode 2 with 4 cell-specific antenna ports, or transmission mode 3 with 4 cell-specific antenna ports and the associated RI is equal to one.
- $\rho_{A1} = P_{A0} + \Delta_{offset\_0}$ dB for any modulation scheme and any number of layers, otherwise.

When channel state information is calculated in non-RPSF subframe, the ratio of PDSCH EPRE to cell-specific reference signals EPRE may be assumed to be:

- $\rho_{A2} = P_{A1} + \Delta_{offset\_1} + 10 \log 10(2)$ dB for any modulation scheme, if the user equipment is configured with transmission mode 2 with 4 cell-specific antenna ports, or transmission mode 3 with 4 cell-specific antenna ports and the associated RI is equal to one.
- $\rho_{A2} = P_{A1} + \Delta_{offset\_1}$ dB for any modulation scheme and any number of layers, otherwise.

It should be noted that the transmission power of CRS and PDSCH is different for different subframes and the transmission power of PDSCH is also not the same. Hence, two power level values $P_{A0}$ and $P_{A1}$ are used separately for RPSF and non-RPSF. $P_A$ is the second power level value and $P_{A1}$ is the third power level value and they are transmitted from the first base station 210 as described above.

The compensated SINR may be given by $$SINR_{compensated}^{(UE)} = g_2(H, I, \sigma, \rho_A)$$

where $g_2(\cdot)$ is a function. For example, $g_2(\cdot)$ may be given by:

$$g_2(H, I, \sigma, \rho_A) = \rho_A f(H, I, \sigma)$$

Hence, for RPSF, the $SINR_{compensated}^{(UE)}$ may be given by $$SINR_{compensated-RPSF}^{(UE)} = \rho_{A1} SINR_{est-RPSF}^{(UE)}$$

while for normal subframe, $SINR_{compensated}^{(UE)}$ may be given by $$SINR_{compensated-non-RPSF}^{(UE)} = \rho_{A2} SINR_{est-non-RPSF}^{(UE)}$$

SINR Compensation in the Macro User Equipment when CSI-RS is Used:

When CSI-RS is used, the compensated SINR in CSI_0 subframes and CSI_1 subframes may be given by $$SINR_{compensated0}^{(UE)} = g_3(H, I, \sigma, P_{c0})$$

$$SINR_{compensated1}^{(UE)} = g_4(H, I, \sigma, P_{c1})$$

where $g_3(\cdot)$ and $g_4(\cdot)$ is a function. For example, $g_3(\cdot)$ and $g_4(\cdot)$ may be given by:

$$g_3(H, I, \sigma, \rho_A) = P_{c0} f(H, I, \sigma)$$

$$g_4(H, I, \sigma, \rho_A) = P_{c1} f(H, I, \sigma)$$

Hence, the compensated SINRs in CSI_0 subframes $SINR_{compensated}^{(UE)}$ may be given by $$SINR_{compensated0}^{(UE)} = P_{c0} SINR_{est0}^{(UE)}$$

And the compensated SINRs in CSI_1 subframes may be given by $$SINR_{compensated1}^{(UE)} = P_{c1} SINR_{est0}^{(UE)}$$

$P_{c0}$ is the fourth power level value and $P_{c1}$ is the fifth power level value and they are transmitted from the first base station 210 as described above.

When CSI-RS is used, the compensated SINR in CSI_0 subframes and CSI_1 subframes may alternatively be given by $$SINR_{compensated0}^{(UE)} = P_D SINR_{est0}^{(UE)} \text{ for } CSI\_0 \text{ subframes}$$

and $$SINR_{compensated1}^{(UE)} = g_5(P_{A0}, P_{A1}, P_D) \cdot SINR_{est1}^{(UE)} \text{ for } CSI\_1$$

subframes. Here, $g_5(\cdot)$ is a function. For example, it may be $g_5(P_{A0}, P_{A1}, P_D) = P_{A0} - P_{A1} + P_D$.

$P_D$ is the seventh power level value, $P_{A0}$ is the eight power level value and $P_{A1}$ is the ninth power level value and they are transmitted from the first base station 210 as described above.

Action 508 above is related to calculating channel state information. The channel state information may comprise CQI, PMI and RI. As an example CQI, PMI and RI are calculated with the compensated SINR. CQI, PMI and RI are derived based on the estimated channel impulse response, interference, noise and the compensated SINR.

In order for the base station 210 and the user equipment 222 to be able to perform the embodiments described herein the following signaling support may be implemented in the base station. Hence, the RRC (Radio Resource Control) signaling for CQI-report-configuration may be updated. In this example the CQI-report-configuration comprises all the configurations for the CQI, PMI and RI.

Below are two examples of options that may be used for the RRC signaling:

Option 1: Reuse the nomPDSCH-RS-EPRE-Offset-r10 for one of CSI subframe set, e.g., CSI_1, and introduce a new value nomPDSCH-RS-EPRE-Offset2-r10 for the other CSI subframe set, e.g., CSI_0.

For example, in CQI-ReportConfig-r10, it may be updated as:

```
CQI-ReportConfig-r10 ::= SEQUENCE {
cqi-ReportModeAperiodic-r10 ENUMERATED {
rm12, rm20, rm22, rm30, rm31,
spare3, spare2, spare1} OPTIONAL, -- Need OR
nomPDSCH-RS-EPRE-Offset-r10 INTEGER -1..6,
cqi-ReportPeriodic-r10 CQI-ReportPeriodic-r10 OPTIONAL, -- Need ON
aperiodicCSI-Trigger-r10 SEQUENCE {
trigger1-r10 BIT STRING SIZE 8,
trigger2-r10 BIT STRING SIZE 8
} OPTIONAL, -- Need ON
pmi-RI-Report-r9 ENUMERATED {setup} OPTIONAL, -- Cond PMIRI
csi-SubframePatternConfig-r10 CHOICE {
release NULL,
setup SEQUENCE {
nomPDSCH-RS-EPRE-Offset2-r10,
csi-SubframePattern-r10 SEQUENCE {
csi-SubframeSet1-r10 MeasSubframePattern-r10,
csi-SubframeSet2-r10 MeasSubframePattern-r10
},
```

```
cqi-ReportPeriodicIndex-r10 SEQUENCE {
cqi-pmi-ConfigIndex2-r10 INTEGER 0..2023,
ri-ConfigIndex2-r10 INTEGER 0..2023 OPTIONAL -- Need OR}
OPTIONAL -- Cond Periodic }}}
```

The option may be well backward with the user equipments without this advanced compensation.
Option 2: Introduce two new offsets for CSI_0 and CSI_1.
For example: The following changes may be done
Change:

```
cqi-ReportPeriodicIndex-r10 SEQUENCE {
cqi-pmi-ConfigIndex2-r10 INTEGER 0..2023,
ri-ConfigIndex2-r10 INTEGER 0..2023 OPTIONAL -- Need OR
} OPTIONAL -- Cond Periodic
Into:
cqi-ReportPeriodicIndex-r10 SEQUENCE {
cqi-pmi-ConfigIndex2-r10 INTEGER 0..2023,
ri-ConfigIndex2-r10 INTEGER 0..2023 OPTIONAL -- Need OR
cqi-compensation-offset2-r10
} OPTIONAL -- Cond Periodic
And Change
CQI-ReportPeriodic-r10 ::= CHOICE {
release NULL,
setup SEQUENCE {
cqi-PUCCH-ResourceIndex-r10 INTEGER 0..1184,
cqi-PUCCH-ResourceIndexP1-r10 INTEGER 0..1184 OPTIONAL, --
Need OR
cqi-pmi-ConfigIndex-r10 INTEGER 0..2023
...}
and Into:
CQI-ReportPeriodic-r10 ::= CHOICE {
release NULL,
setup SEQUENCE {
cqi-PUCCH-ResourceIndex-r10 INTEGER 0..1184,
cqi-PUCCH-ResourceIndexP1-r10 INTEGER 0..1184 OPTIONAL, --
Need OR
cqi-pmi-ConfigIndex-r10 INTEGER 0..2023
cqi-compensation-offset-r10
...}
```

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method in a first base station for obtaining channel state information from a user equipment, which first base station is included in a wireless communication system and which wireless communication system further includes the user equipment, wherein the method comprises:
estimating a first offset value for a first set of subframes based on a first channel information, where the subframes of the first set of subframes are of a first type;
estimating a second offset value for a second set of subframes based on a second channel information, where the subframes of the second set of subframes are of a second type;
transmitting the estimated first offset value and the estimated second offset value to the user equipment; and
obtaining channel state information from the user equipment, where said channel state information is based on the estimated first offset value and the estimated second offset value and is to be used for transmission in the first base station.

2. The method of claim 1, wherein at least one of the first channel information and the second channel information comprises one or more of: load information, position information, statistics of an outer loop link adaptation operation, and reference signal values and other channel information.

3. The method of claim 1, wherein estimating the first offset value and estimating the second offset value is performed by estimating a ratio difference between a first Signal to Interference and Noise Ratio (SINR) measured at reference signal Resource Elements (REs) and a second SINR measured at Physical Downlink Shared Channel (PDSCH) REs for the first set of subframes and the second set of subframes respectively.

4. The method of claim 3, wherein the ratio difference is estimated by tracking changes of the first SINR and the second SINR for the first set of subframes and for the second set of subframes separately.

5. The method of claim 3, wherein the wireless communication system further comprises at least one second base station, and wherein the method further comprises:
receiving channel information from the user equipment, wherein the channel information comprises a reference signal value for the first base station and a second reference signal value for the at least one second base station, and which channel information is used both as the first channel information and as the second channel information; and
determining a difference between the reference signal value for the first base station and the second reference signal value for the at least one second base station, which difference is used when estimating the ratio difference between the first SINR measured at reference signal REs, and the second SINR measured at PDSCH REs.

6. The method of claim 1, wherein the wireless communication system further comprises at least one second base station, wherein the first base station is a first pico base station and the second base station is either a macro base station or a second pico base station, and wherein the subframes of the first type and the subframes of the second type are determined by dividing subframes in the first base station into the first and second type based on an interference pattern of corresponding subframes in at least the second base station.

7. The method of claim 6, wherein the first base station is a pico base station and the second base station is a macro base station, wherein the subframes of the first type are subframes in the first base station which are interfered with by almost blank subframes or reduced power subframes in the second base station, and wherein the subframes of the second type are subframes in the first base station which are interfered with by non-almost blank subframes or non-reduced power subframes in the second base station.

8. The method of claim 1, wherein the wireless communication system further comprises at least one second base station, wherein the first base station is a macro base station and the second base station is a pico base station, wherein the subframes of the first type are almost blank subframes or reduced power subframes in the first base station, and wherein the subframes of the second type are non-almost blank subframes or non-reduced power subframes in the first base station.

9. The method of claim 1, wherein the method further comprises transmitting a first power level value to the user equipment, which first power level value indicates an assumed ratio between a power level of Physical Downlink Shared Channel (PDSCH) Resource Elements (REs) and a power level of Common Reference Signal (CRS) REs for both sets of subframes.

10. The method of claim 1, wherein the method further comprises transmitting a second power level value for the first set of subframes and a third power level value for the second set of subframes to the user equipment, which second power level value indicates an assumed ratio between a power level of Physical Downlink Shared Channel (PDSCH) Resource Elements (REs) and a power level of Common Reference Signal (CRS) REs for the first set of subframes and the third power level value indicates an assumed ratio between the power level of PDSCH REs and the power level of CRS REs for the second set of subframes.

11. The method of claim 1, wherein transmitting the estimated first offset value and the second offset value comprises:
determining a fourth power level value which indicates an assumed ratio between a power level of Physical Downlink Shared Channel (PDSCH) Resource Elements (REs) and a power level of Channel State Information Reference Signal (CSI-RS) REs for the first set of subframes;
determining a fifth power level value which indicates an assumed ratio between a power level of PDSCH REs and a power level of CSI-RS REs for the second set of subframes; and
transmitting said determined fourth power level value and said determined fifth power level value to the user equipment, wherein the estimated first offset value is implicitly signaled by the fourth power level value and the estimated second offset value is implicitly signaled by the fifth power level value.

12. The method of claim 1, wherein transmitting the estimated first offset value and the estimated second offset value comprises:
determining a sixth power level value which sixth power level value indicates an assumed ratio between a power level of Physical Downlink Shared Channel (PDSCH) Resource Elements, REs, and a power level of Channel State Information Reference Signal (CSI-RS) REs for both sets of subframes; and
transmitting said determined sixth power level value to the user equipment, wherein the estimated first offset value and the estimated second offset value are implicitly signaled by the sixth power level value.

13. The method of claim 1, wherein transmitting the estimated first offset value and the second offset value comprises:
determining a seventh power level value which indicates an assumed ratio between a power level of Physical Downlink Shared Channel (PDSCH) Resource Elements (REs) and a power level of Channel State Information Reference Signal (CSI-RS) REs for the first set of subframes or for the second set of subframes;
determining an eighth power level value which eighth power level value indicates an assumed ratio between a power level of PDSCH REs and a power level of Common Reference Signal (CRS) REs for the first set of subframes;
determining a ninth power level value which ninth power level value indicates an assumed ratio between a power level of PDSCH REs and a power level of CRS REs for the second set of subframes; and
transmitting said determined seventh power level value, the eighth power level value and the ninth power level value to the user equipment, wherein the estimated first offset value is implicitly signaled by the seventh power level value and the estimated second offset value is implicitly signaled by the seventh power level value, the eighth power level value and the ninth power level value.

14. A method in a user equipment for transmitting channel state information to a first base station in a wireless communication system, wherein the method comprises:
receiving a first offset value for subframes of the first type and a second offset value for the second type of subframes from the first base station;
estimating a first Signal to Interference and Noise Ratio (SINR) based on reference signals for subframes of a first type;
estimating a second SINR based on reference signals for subframes of a second type;
creating a compensated first SINR based on the estimated first SINR and the received first offset value;
creating a compensated second SINR based on the estimated second SINR and the received second offset value;
calculating channel state information based on said compensated first SINR and said compensated second SINR; and
transmitting the calculated channel state information to the first base station.

15. The method of claim 14, wherein the reference signals for subframes of the first type and the reference signals for subframes of the second type are used for estimating one or more of a channel impulse response, an interference and a noise level, and wherein estimating the first SINR and estimating the second SINR is done based on said estimations of one or more of channel impulse response, interference and noise level.

16. The method of claim 15, wherein the reference signals for subframes of the first type and the reference signals for subframes of the second type are reference signals that are received from the first base station, and wherein the reference signals are Common Reference Signals (CRS), or Channel State Information Reference Signals (CSI-RS).

17. The method of claim 14, wherein the method further comprises
receiving a first power level value from the first base station; and
wherein creating the compensated first SINR and creating the compensated second SINR is further based on said received first power level value.

18. The method of claim 14, wherein the method further comprises:
receiving a second power level value for subframes of a first type and a third power level value for subframes of a second type from the first base station;
wherein creating the compensated first SINR is further based on the received second power level value; and
wherein creating the compensated second SINR is further based on the received third power level value.

19. The method of claim 14, wherein receiving the first offset value for subframes of the first type and the second offset value for the second type of subframes comprises receiving a fourth power level value and a fifth power level value, which fourth power level value implicitly comprises the first offset value for the subframes of the first type, and which fifth power level value implicitly comprises the second offset value for the subframes of the second type, wherein creating the compensated first SINR is further based on the received fourth power level value; and wherein creating the compensated second SINR is further based on the received fifth power level value.

20. The method of claim 14, wherein receiving the first offset value for subframes of the first type and the second offset value for the second type of subframes comprises receiving a sixth power level value, which sixth power level value implicitly comprises the first offset value for the subframes of the first type and the second offset value for subframes of a second type, and wherein creating the compensated first SINR and creating the compensated second SINR is further based on said received sixth power level value.

21. The method of claim 14, wherein receiving the first offset value for subframes of the first type and the second offset value for the second type of subframes comprises receiving a seventh power level value, a eighth power level value and a ninth power level value, which seventh power level value implicitly comprises the first offset value for the subframes of the first type and which seventh power level value, eighth power level value and ninth power level value implicitly comprises the second offset value for subframes of a second type, wherein creating the compensated first SINR is further based on the received seventh power level value, and wherein creating the compensated second SINR is further based on the received seventh power level value, the received eighth power level value and the received ninth power level value.

22. The method of claim 14, wherein the wireless communication system further comprises at least one second base station, where the first base station is a pico base station and the second base station is a macro base station, and wherein the subframes of the first type and the subframes of the second type are different types of subframes in the first base station which are interfered with by subframes in a second base station, which subframes of a first type are subframes that are interfered with by almost blank subframes or reduced power subframes and which subframes of a second type are interfered with by non-almost blank subframes or non-reduced power subframes.

23. The method of claim 14, wherein the wireless communication system further comprises at least one second base station, where the first base station is a macro base station and the second base station is a pico base station, wherein the subframes of the first type and the subframes of the second type are different types of subframes in the first base station, wherein the subframes of the first type are almost blank subframes or reduced power subframes in the first base station and wherein the subframes of the second type are non-almost blank subframes or non-reduced power subframes in the first base station.

24. The method of claim 14, wherein the channel state information comprises at least one of a channel quality indicator, a preferred matrix indicator and a rank indicator, where the channel quality indicator, preferred matrix indicator and rank indicator are calculated based on one or more of channel estimation, interference estimation, noise level estimation, the compensated first SINR, and the compensated second SINR.

25. A first base station configured to obtain channel state information from a user equipment, wherein the first base station is included in a wireless communication system and comprises:
an estimating circuit configured to estimate a first offset value for a first set of subframes based on a first channel information, where the subframes of the first set of subframes are of a first type and to estimate a second offset value for a second set of subframes based on a second channel information, where the subframes of the second set of subframes are of a second type;
a first transmitting circuit configured to transmit the estimated first offset value for the first set of subframes and the estimated second offset value for the second set of subframes to the user equipment; and
a first receiving circuit configured to obtain channel state information from the user equipment, where the channel state information is based on the estimated first offset value and the estimated second offset value and is to be used for transmission in the first base station.

26. The first base station of claim 25, wherein at least one of the first channel information and the second channel information comprises one or more of: load information, position information, statistics of an outer loop link adaptation operation, and reference signal values and other channel information.

27. The first base station of claim 25, wherein the estimating circuit is configured to estimate the first offset value and to estimate the second offset value by estimating a ratio difference between a first Signal to Interference and Noise Ratio (SINR) measured at Reference Signal (RS) Resource Elements (REs) and a second SINR measured at Physical Downlink Shared Channel (PDSCH) Resource Elements (REs) for the first subframe type and the second subframe type, respectively.

28. The first base station of claim 27, wherein the ratio difference is estimated by tracking changes of the first SINR and the second SINR for the first set of subframes and for the second set of subframes separately.

29. The first base station of claim 27, wherein the wireless communication system further includes at least one second base station and the first base station further comprises:
a second receiving circuit configured to receive channel information from the user equipment, wherein the channel information comprises a reference signal value for the first base station and a second reference signal value for the second base station, where the channel information is used both as the first channel information and as the second channel information; and
a determining circuit configured to determine a difference between the reference signal value for the first base station and the second reference signal value for the second base station, which difference is used when estimating the ratio difference between the first SINR measured at reference signal REs and the second SINR measured at PDSCH REs.

30. The first base station of claim 25, wherein the wireless communication system further comprises at least one second base station, wherein the first base station is a first pico base station and the second base station is either a macro base station or a second pico base station, and wherein the subframes of the first type and the subframes of the second type are determined by dividing subframes in the first base station into the first and second type based on an interference pattern of corresponding subframes in at least the second base station.

31. The first base station of claim 30, wherein the first base station is a pico base station and the second base station is a macro base station, wherein the subframes of the first type are subframes in the first base station which are interfered with by almost blank subframes or reduced power subframes in the second base station, and wherein the subframes of the second type are subframes in the first base station which are interfered with by non-almost blank subframes or non-reduced power subframes in the second base station.

32. The first base station of claim 25, wherein the wireless communication system further comprises at least one second base station, wherein the first base station is a macro base station and the second base station is a pico base station, wherein the subframes of the first type are almost blank subframes or reduced power subframes in the first base station, and wherein the subframes of the second type are non-almost blank subframes or non-reduced power subframes, in the first base station.

33. The first base station of claim 25, the first base station further comprising:
a second transmitting circuit configured to transmit a first power level value to the user equipment, which first power level value indicates an assumed ratio between a power level of Physical Downlink Shared Channel (PDSCH) Resource Elements (REs) and a power level of Common Reference Signal (CRS) REs for both set of subframes.

34. The first base station of claim 25, the first base station further comprising:
a second transmitting circuit configured to transmit a second power level value for the first set of subframes and a third power level value for the second set of subframes to the user equipment, which second power level value indicates an assumed ratio between a power level of Physical Downlink Shared Channel (PDSCH) Resource Elements (REs) and a power level of Common Reference Signal (CRS) REs for the first set of subframes and the third power level value indicates an assumed ratio between the power level of PDSCH REs and the power level of CRS REs for the second set of subframes.

35. The first base station of claim 25, wherein the first transmitting circuit is further configured to:
determine a fourth power level value which indicates an assumed ratio between a power level of Physical Downlink Shared Channel (PDSCH) Resource Elements (REs) and a power level of Channel State Information Reference Signal (CSI-RS) REs for the first set of subframes;
determine a fifth power level value which indicates an assumed ratio between a power level of PDSCH REs and a power level of CSI-RS REs for the second set of subframes; and
transmit said determined fourth power level value and said determined fifth power level value to the user equipment, wherein the estimated first offset value is implicitly signaled by the fourth power level value and the estimated second offset value is implicitly signaled by the fifth power level value.

36. The first base station of claim 25, wherein the first transmitting circuit is further configured to:
determine a sixth power level value which sixth power level value indicates an assumed ratio between a power level of Physical Downlink Shared Channel (PDSCH) Resource Elements (REs) and a power level of Channel State Information Reference Signals (CSI-RS) REs for both sets of subframes; and
transmit said determined sixth power level value to the user equipment, wherein the estimated first offset value and the estimated second offset value are implicitly signaled by the sixth power level value.

37. The first base station of claim 25, wherein the first transmitting circuit is further configured to:
determine a seventh power level value which indicates an assumed ratio between a power level of Physical Downlink Shared Channel (PDSCH) Resource Elements (REs) and a power level of Channel State Information Reference Signal (CSI-RS) REs for the first set of subframes or for the second set of subframes;
determine an eighth power level value which eighth power level value indicates an assumed ratio between a power level of PDSCH REs and a power level of Common Reference Signal (CRS) REs for the first set of subframes;
determine a ninth power level value which ninth power level value indicates an assumed ratio between a power level of PDSCH REs and a power level of CRS REs for the second set of subframes; and
transmit said determined seventh power level value, the eighth power level value and the ninth power level value to the user equipment, wherein the estimated first offset value are implicitly signaled by the seventh power level value and the estimated second offset value are implicitly signaled by the seventh power level value, the eighth power level value and the ninth power level value.

38. A user equipment configured to transmit channel state information to a first base station in a wireless communication, wherein the user equipment comprises:
a first receiving circuit configured to receive a first offset value for subframes of a first type and to receive a second offset value for a second type of subframes from the first base station;
an estimating circuit configured to estimate a first Signal to Interference and Noise Ratio (SINR) based on reference signals for subframes of a first type and to estimate a second SINR based on reference signals for subframes of a second type;
a creating circuit configured to create a compensated first SINR based on the estimated first SINR and the received first offset value and to create a compensated second SINR based on the estimated second SINR and the received second offset value;
a calculating circuit configured to calculate channel state information based on said compensated first SINR and said compensated second SINR; and
a transmitting circuit configured to transmit the calculated channel state information to the first base station.

39. The user equipment of claim 38, wherein the reference signals for subframes of the first type and the reference signals for subframes of the second type are used for estimating one or more of a channel impulse response, an interference and a noise level, and wherein the estimating circuit is configured to estimate a first SINR and a second SINR based on said estimations of one or more of channel impulse response, interference and noise level.

40. The user equipment of claim 39, the user equipment further comprising:
a second receiving circuit configured to receive the reference signals for subframes of the first type and the reference signals for subframes of the second type from the first base station, and wherein the received reference signals are Common Reference Signals (CRS) or Channel State Information Reference Signals (CSI-RS).

41. The user equipment of claim 38, the user equipment further comprising:
a third receiving circuit configured to receive a first power level value from the first base station; and
wherein the creating circuit is further configured to create the compensated first SINR and create the compensated second SINR further based on said received first power level value.

42. The user equipment of claim 38, the user equipment further comprising:
a third receiving circuit configured to receive a second power level value for subframes of a first type and a third power level value for subframes of a second type from the first base station; and wherein the creating circuit is further configured to create the compensated first SINR further based on the received second power level value, and to create the compensated second SINR further based on the received third power level value.

43. The user equipment of claim 38, wherein the first receiving circuit is further configured to receive a fourth power level value and a fifth power level value, which fourth power level value implicitly comprises the first offset value for the subframes of the first type, and which fifth power level value implicitly comprises the second offset value for the subframes of the second type, and wherein the creating circuit is further configured to create the compensated first SINR further based on the received fourth power level value, and to create the compensated second SINR further based on the received fifth power level value.

44. The user equipment of claim 38, wherein the first receiving circuit is further configured to receive a sixth power level value, which sixth power level value implicitly comprises the first offset value for the subframes of the first type and the second offset value for subframes of a second type, and wherein the creating circuit is further configured to create the compensated first SINR and the compensated second SINR further based on said received sixth power level value.

45. The user equipment of claim 38, wherein the first receiving circuit is further configured to receive a seventh power level value, a eighth power level value and a ninth power level value, which seventh power level value implicitly comprises the first offset value for the subframes of the first type and which seventh power level value, eighth power level value and ninth power level value implicitly comprises the second offset value for subframes of a second type, and wherein the creating circuit is further configured to create the compensated first SINR further based on the received seventh power level value, and to create the compensated second SINR further based on the received seventh power level value, the received eighth power level value and the received ninth power level value.

46. The user equipment of claim 38, wherein the wireless communication system further comprises at least one second base station, wherein first base station is a pico base station and the second base station is a macro base station, and wherein the subframes of the first type and the subframes of the second type are different types of subframes in the first base station which are interfered with by subframes in a second base station, which subframes of a first type are subframes that are interfered with by almost blank subframes or reduced power subframes and which subframes of a second type are subframes that are interfered with by non-almost blank subframes or non-reduced power subframes.

47. The user equipment of claim 38, wherein the wireless communication system further comprises at least one second base station, wherein the first base station is a macro base station and the second base station is a pico base station, wherein the subframes of the first type and the subframes of the second type are different types of subframes in the first base station, and wherein the subframes of the first type are almost blank subframes or reduced power subframes in the first base station and wherein the subframes of the second type are non-almost blank subframes or non-reduced power subframes in the first base station.

48. The user equipment of claim 38, wherein the channel state information comprises at least one of a channel quality indicator, a preferred matrix indicator and a rank indicator, and wherein the calculating circuit is configured to calculate the channel quality indicator, preferred matrix indicator and rank indicator based on one or more of the channel estimations, interference estimations, noise level estimations, the compensated first SINR, and the compensated second SINR.

* * * * *

UNITED STATES PATENT AND TRADEMARK OFFICE
CERTIFICATE OF CORRECTION

PATENT NO. : 8,953,475 B2
APPLICATION NO. : 13/496445
DATED : February 10, 2015
INVENTOR(S) : Li et al.

It is certified that error appears in the above-identified patent and that said Letters Patent is hereby corrected as shown below:

Specification

In Column 1, Line 19, delete "Access" and insert -- Radio Access --, therefor.

In Column 21, Line 33, delete "$SINR_{copensated\_0}$," and insert -- $SINR_{compensated\_0}$, --, therefor.

In Column 21, Lines 36-37, delete "$SINR_{copensated\_1}$," and insert -- $SINR_{compensated\_1}$, --, therefor.

In Column 24, Lines 55-57, delete "$SINR_{compensated0} = g_3(H, I, \sigma, \rho_{c0})$ $SINR_{compensated1} = g_4(H, I, \sigma, \rho_{c1})$," and insert -- $SINR^{(UE)}_{compensated0} = g_3(H, I, \sigma, P_{c0})$ $SINR^{(UE)}_{compensated1} = g_4(H, I, \sigma, P_{c1})$ --, therefor.

In Column 26, Line 13, delete "$SINR^{(UE)}_{compensated1} = P_{c1} SINR^{(UE)}_{est0}$,"

and insert -- $SINR^{(UE)}_{compensated1} = P_{c1} SINR^{(UE)}_{est1}$ --, therefor.

In Column 26, Line 20, delete ""$^{CSI}\_0$" and insert -- CSI_0 --, therefor.

In Column 26, Line 22, delete ""$^{CSI}\_1$" and insert -- CSI_1 --, therefor.

Signed and Sealed this
Twentieth Day of October, 2015

Michelle K. Lee
*Director of the United States Patent and Trademark Office*